United States Patent
Ashizawa et al.

[11] Patent Number: 5,939,847
[45] Date of Patent: *Aug. 17, 1999

[54] DRIVE CONTROL DEVICE FOR ULTRASONIC MOTORS

[75] Inventors: Takatoshi Ashizawa, Kawasaki; Tadao Takagi, Yokohama, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/845,205

[22] Filed: Apr. 21, 1997

Related U.S. Application Data

[63] Continuation of application No. 08/545,057, Oct. 19, 1995, abandoned, which is a continuation of application No. 08/101,720, Aug. 4, 1993, abandoned.

[30] Foreign Application Priority Data

| | | | |
|---|---|---|---|
| Aug. 7, 1992 | [JP] | Japan | 4-233092 |
| Feb. 26, 1993 | [JP] | Japan | 5-063441 |
| Jul. 23, 1993 | [JP] | Japan | 5-202562 |

[51] Int. Cl.[6] .................................................. H01L 41/08
[52] U.S. Cl. .......................... 318/116; 310/316; 310/323
[58] Field of Search .................................. 310/316, 317, 310/319, 323, 328; 318/116

[56] References Cited

U.S. PATENT DOCUMENTS

| | | | |
|---|---|---|---|
| 4,928,030 | 5/1990 | Culp | 310/328 |
| 4,935,659 | 6/1990 | Naka et al. | 310/328 |
| 4,983,875 | 1/1991 | Masaki et al. | 310/323 |
| 4,990,835 | 2/1991 | Ohnishi et al. | 318/116 |
| 5,013,955 | 5/1991 | Hara et al. | 310/316 |
| 5,130,619 | 7/1992 | Izuno | 318/116 |
| 5,146,143 | 9/1992 | Furutsu | 318/116 |
| 5,165,047 | 11/1992 | Shimizu | 318/116 |
| 5,173,631 | 12/1992 | Suganuma | 310/316 |
| 5,254,899 | 10/1993 | Suzuki et al. | 310/323 |
| 5,285,134 | 2/1994 | Kataoka | 318/116 |
| 5,440,212 | 8/1995 | Fukui | 318/116 |

FOREIGN PATENT DOCUMENTS

| | | |
|---|---|---|
| 61-251490 | 11/1986 | Japan. |
| 1-17354 | 3/1989 | Japan. |
| 1-227669 | 9/1989 | Japan. |
| 4-281375 | 10/1992 | Japan. |

*Primary Examiner*—Mark O Budd

[57] ABSTRACT

A drive control device for ultrasonic motors (actuators), including a driving unit for driving the ultrasonic motors, a detecting device for detecting the characteristics of each of two ultrasonic motors and generating a signal indicating the difference in the characteristics, and an output difference controlling unit for controlling the driving unit based on the signal from the detecting device, thereby regulating the difference in the outputs of the two ultrasonic motors.

13 Claims, 21 Drawing Sheets

FIG. 1
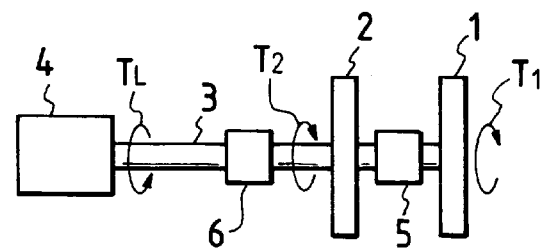
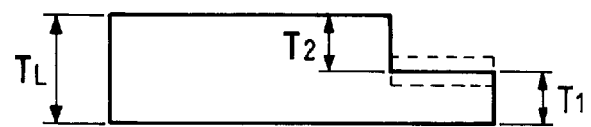
FIG. 2
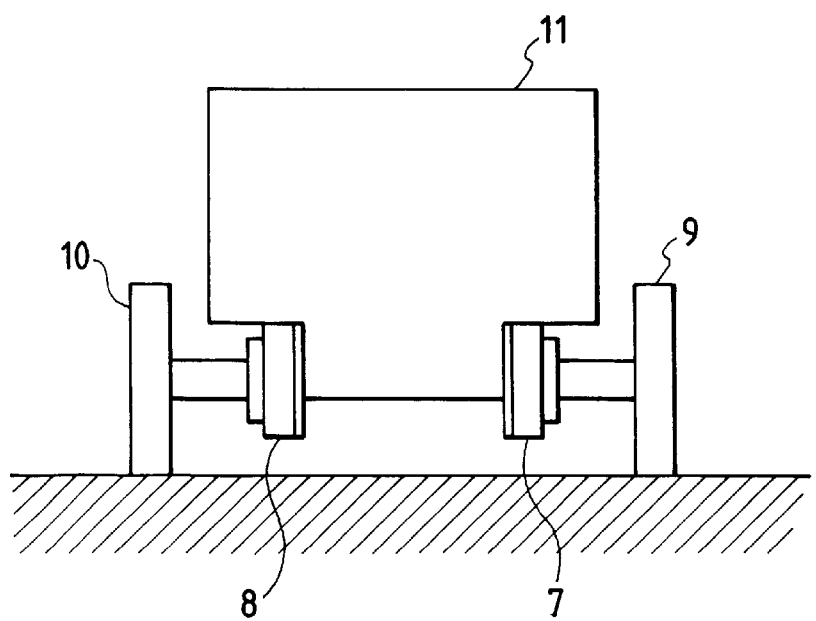

DRIVE CONTROL DEVICE FOR ULTRASONIC MOTORS

This application is a continuation of Ser. No. 08/545,057 filed Oct. 19, 1995 which is a continuation of Ser. No. 08/101,720 filed Aug. 4, 1993, both now abandoned.

BACKGROUND OF THE INVENTION

1. Field of the Invention

The present invention relates to a drive control device for drive control of plural ultrasonic motors.

2. Related Background Art

In driving a rotated member such as a rotary shaft or a rotary tube with plural ultrasonic motors, the torques generated by said ultrasonic motors may become mutually different at a certain rotating speed, because the relationship between the generated torque (output) and the rotating speed may be different from motor to motor.

This phenomenon will be explained in more detail with reference to FIG. 1, showing torsion moments generated in various parts of an output shaft of ultrasonic motors. A first ultrasonic motor 1 and a second ultrasonic motor 2 are mutually connected by a shaft 3, on which a load device 4 is further mounted. First and second torsion amount detecting devices 5, 6 mounted on said shaft 3 determine the torsion moments in the different parts of the shaft 3, and the outputs (torques) generated by said first and second ultrasonic motors 1, 2 can be determined by said torsion moments.

In the configuration shown in FIG. 1, if the generated torque as a function of the rotating speed is the same for both motors 1, 2, the torques T1, T2 generated by said motors 1, 2 become mutually equal. However, if the torque as a function of the rotating speed is different for the motors 1, 2, the torques T1, T2 generated by said motors 1, 2 become mutually different as indicated by broken lines, since they are connected by the same shaft 3 and have therefore a same rotating speed. The load torque TL is given by the sum of the generated torques T1 and T2.

Because of this phenomenon, the performances of both ultrasonic motors cannot be fully exploited.

Also in case either of the ultrasonic motors 1, 2 is scarcely rotated at a given frequency because of a significant difference in the performances of said motors 1, 2, such motor constitutes a load due to the pressed contact between the stator and the rotor, thus hindering improvement in the driving efficiency.

In order to overcome such a drawback, there has been proposed a configuration of providing the ultrasonic motors with respectively independent driving circuits and respectively regulating the frequencies of driving signals for said motors (cf. FIG. 7 in the Japanese Patent Laid-open Application No. 1-227669), but such regulation of the torques of the motors 1, 2 at substantially the same levels requires additional process steps, thus deteriorating mass producibility.

Also, in case the rotating speed has to be varied according to the situation of operation, the torques generated by the ultrasonic motors 1, 2 are mutually equal at the rotating speed at which the regulation was conducted, but may become mutually somewhat different at different rotating speeds because of the fluctuation in the motor performances.

Also, in case of connecting two or more ultrasonic motors of different performances, a motor of a lower power tends to be given an excessive load while a motor of a higher power tends to be given an insufficient load, if the same outputs are assigned to these motors. For this reason, the load has to be adjusted for each motor, according to its ability.

Also, in case of employing, as shown in FIG. 2, two or more ultrasonic motors 7, 8 as the driving sources for wheels 9, 10 of a movable member 11, a method of matching the outputs of said motors 7, 8 is effective when the movable member 11 proceeds linearly, but, when it turns in either direction, the outputs (generated torques and rotating speeds) of the motors 7, 8 have to be varied.

SUMMARY OF THE INVENTION

An object of the present invention is to provide a drive control device for ultrasonic motors capable, in case of driving a rotary member with plural ultrasonic motors, of maintaining the torques generated by said motors at a substantially same level, without the adjustment of torque of each motor at the production stage thereof.

Another object of the present invention is to provide a drive control device for ultrasonic motors, capable, in the above-mentioned case, of achieving efficient drive over the substantially entire rotating speed range, by providing driving frequencies which generate substantially uniform driving powers from the different ultrasonic motors in response to the variable rotating speed.

Still another object of the present invention is to provide a drive control device for ultrasonic motors, capable, in the above-mentioned case, of achieving efficient drive over the substantially entire rotating speed range, by providing driving signal voltages which generate substantially uniform driving powers from the different ultrasonic motors in response to the variable rotating speed.

Still another object of the present invention is to provide a drive control device for ultrasonic motors, capable of controlling said motors with different output powers in case such different powers are required, thereby resolving the above-mentioned drawbacks in the prior art.

The above-mentioned objects can be attained according to the present invention, by a drive control device for driving a rotary member with plural ultrasonic motors, comprising first and second ultrasonic motor driving portions for driving first and second ultrasonic motors; an output difference detecting portion for detecting the difference in the outputs of said first and second ultrasonic motors; and an output difference controlling portion for controlling either or both of said first and second ultrasonic motor driving portions according to the result of measurement by said output difference detecting portion.

In this configuration, said output difference controlling portion is featured by controlling said second ultrasonic motor driving portion in such a manner as to cancel the difference in the output of said second motor from that of said first motor, according to the result of measurement by said output difference detecting portion.

Also, said output difference detecting portion is featured by detection of the amount of elastic deformation in a connecting member, connecting said ultrasonic motors.

According to the present invention, the output difference detecting portion detects the difference in the outputs of the first and second ultrasonic motors, and the output difference controlling portion controls the first or second motor driving portion according to the result of said detection.

In this operation, the output difference controlling portion controls the second motor driving portion so as to cancel the difference in the output of the second ultrasonic motor from that of the first ultrasonic motor according to the result of measurement by the output difference detecting portion, whereby the ultrasonic motors can be driven with substantially the same torques.

In another embodiment, the drive control device of the present invention for the ultrasonic motors is provided with first and second motor driving portions for driving first and second ultrasonic motors; an output difference detecting portion for detecting the difference in the outputs of said first and second ultrasonic motors; and an output difference controlling portion for controlling either or both of said first and second motor driving portions according to the result of measurement by said output difference detecting portion, wherein said output difference controlling portion is adapted to control the input voltage of the drive signal entered to said first or second ultrasonic motor, according to the result of measurement by said output difference detecting portion.

In still another embodiment, said output difference controlling portion is featured by controlling the frequency of the drive signal entered to said first or second ultrasonic motor, according to the result of measurement by said output difference detecting portion.

In still another embodiment, said output difference controlling portion is featured by controlling said second motor driving portion so as to cancel the difference in the output of said second ultrasonic motor from that of said first ultrasonic motor, according to the result of measurement by said output difference detecting portion.

According to the present invention, the output difference detecting portion detects the difference in the outputs of the first and second ultrasonic motors, and the output difference controlling portion controls the first or second motor driving portion by the voltage and/or frequency of the driving signal, according to the result of said detection.

In this operation, the output difference controlling portion controls the second motor driving portion so as to cancel the difference in the output of the second ultrasonic motor from that of the first ultrasonic motor according to the result of measurement by the output difference detecting portion, whereby the ultrasonic motors can be driven with substantially the same output torques.

In another embodiment, said output difference detecting portion is featured by detecting the difference in the amplitude of vibration signals from a mechanoelectrical converting portion provided on the vibration member of first ultrasonic wave motor and from a mechanoelectrical converting portion provided on the vibration member of said second ultrasonic motor.

In another embodiment, said output difference detecting portion is featured by detecting the difference in the currents supplied to said first and second ultrasonic motors.

In another embodiment, said output difference detecting portion is featured by detecting the difference between a phase difference between the drive signal supplied to said first ultrasonic motor and the vibration signal from a mechanoelectrical converting portion provided on the vibration member of said first ultrasonic motor, and a phase difference between the drive signal supplied to said second ultrasonic motor and the vibration signal from a mechanoelectrical converting portion provided on the vibration member of said second ultrasonic motor.

In another embodiment, said output difference controlling portion is featured by controlling the frequency of the drive signal supplied to said first or second ultrasonic motor.

In another embodiment, said output difference controlling portion is featured by controlling the voltage of the drive signal supplied to said first or second ultrasonic motor.

In another embodiment, said output difference controlling portion is featured by controlling the voltage and the frequency of the drive signal supplied to said first or second ultrasonic motor.

According to the present invention, the output difference detecting portion detects the difference in the outputs of first and second ultrasonic motors, and the output difference controlling portion controls said first or second motor driving portion, according to the result of said detection.

In this operation, the output difference controlling portion controls the second motor driving portion so as to cancel the difference in the output of the second ultrasonic motor from that of the first ultrasonic motor, according to the result of measurement by the output difference detecting portion, whereby the ultrasonic motors can be driven with substantially the same outputs.

In another embodiment, the drive control device for driving a driven member with plural ultrasonic motors comprises first and second motor driving portions for driving first and second ultrasonic motors; an output difference detecting portion for detecting the difference in the outputs of said first and second ultrasonic motors; and an output difference controlling portion for generating a predetermined difference in the outputs of said first and second ultrasonic motors. The drive control device further comprises an output difference setting portion for setting an output difference, wherein the output difference controlling portion is adapted to control either or both of said first and second motor driving portions so as to generate a difference in the outputs of said first and second ultrasonic motors, according to the result of said output difference detecting portion, detecting the difference in the outputs of said first and second ultrasonic motors.

In another embodiment, said output difference controlling portion is featured by controlling the frequency of the drive signal supplied to said first or second ultrasonic motor.

In another embodiment, said output difference controlling portion is featured by controlling the voltage of the drive signal supplied to said first or second ultrasonic motor.

In another embodiment, said output difference controlling portion is featured by controlling the voltage and the frequency of the drive signal supplied to said first or second ultrasonic motor.

According to the present invention, the output difference controlling portion controls said first or second motor driving portion so as to generate a predetermined difference in the outputs of the first and second ultrasonic motors.

Also the output difference setting portion sets a predetermined output difference, while the output difference detecting portion detects the difference in the outputs of the first and second ultrasonic motors, and the output difference controlling portion controls the first or second motor driving portion so as to generate a predetermined difference in the outputs of the first and second ultrasonic motors, according to the result of said detection and to the value set by said output difference setting portion.

BRIEF DESCRIPTION OF THE DRAWINGS

FIG. 1 is a view showing torsion moments generated in various parts of an output shaft;

FIG. 2 is an external view of an equipment employing the drive control device of the present invention for ultrasonic motors;

DESCRIPTION OF THE PREFERRED EMBODIMENTS

Now the present invention will be clarified in detail by preferred embodiments, with reference to the attached drawings.

Figure 3:
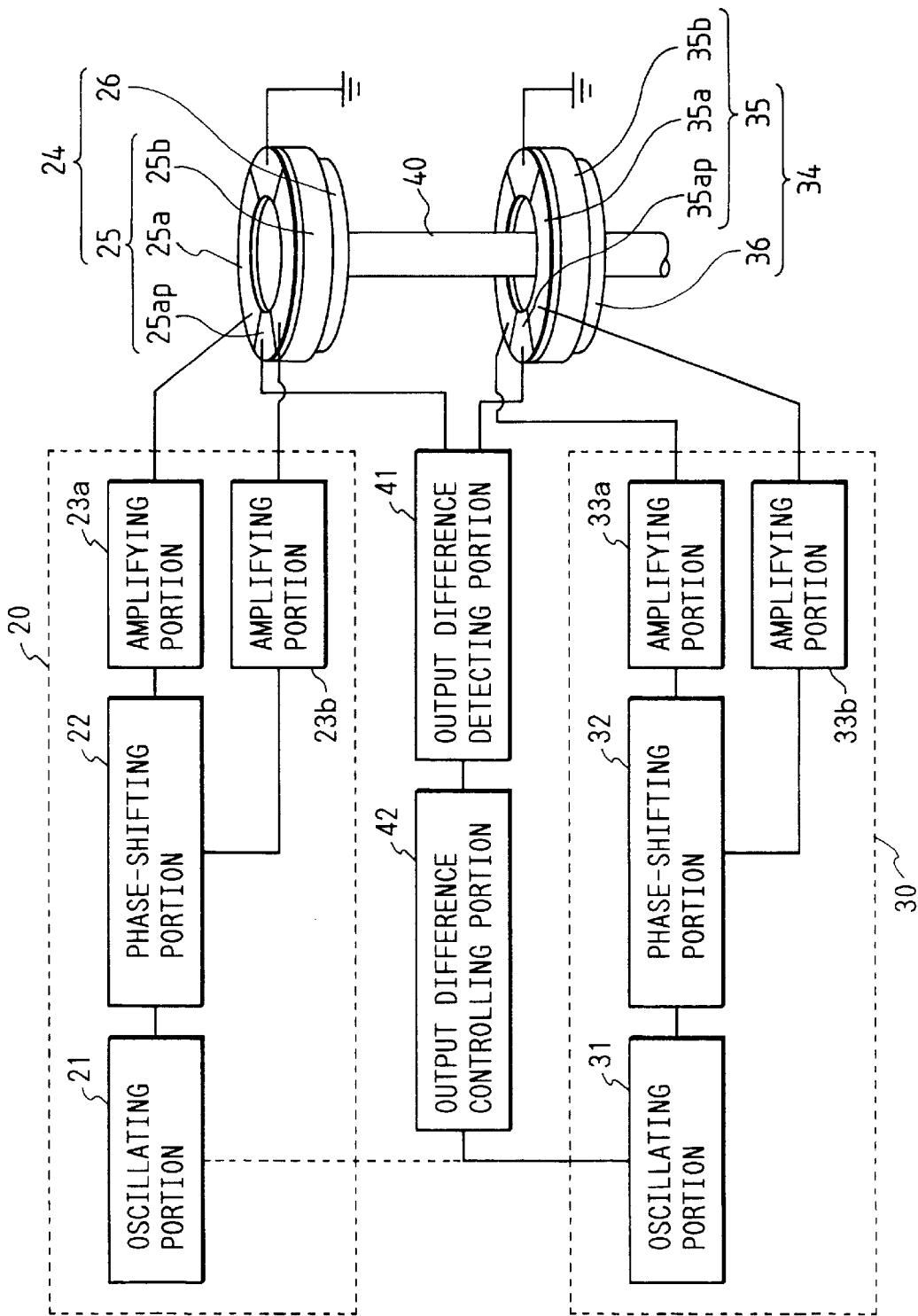
FIG. 3 is a view of a first embodiment of the drive control device of the present invention for ultrasonic motors.

FIG. 3 is a block diagram of a first embodiment of the drive control device of the present invention, for ultrasonic motors.

A first driving portion 20 is provided with a first oscillation portion 21 for generating a drive signal, a first phase shifting portion 22 for dividing said drive signal into two, and first amplifying portions 23a, 23b for respectively amplifying the thus divided drive signals.

A first ultrasonic motor 24 comprises a first stator 25 including a first piezoelectric member 25a oscillated by the amplified drive signals from said first amplifying portions 23a, 23b, and an elastic member 25b adhered to said piezoelectric member 25a and generating a travelling vibration wave on a driving surface by said oscillation, and a first movable member 26 maintained in pressure contact with the driving surface of said elastic member 25b and driven by said travelling vibration wave.

Similarly, a second driving portion 30 is provided with a second oscillation portion 31 for generating a drive signal, a second phase shifting portion 32 for dividing said drive signal into two, and second amplifying portions 33a, 33b for respectively amplifying the thus divided drive signals.

A second ultrasonic motor 34 comprises a second stator 35 including a second piezoelectric member 35a oscillated by the amplified drive signals from said second amplifying portions 33a, 33b, and an elastic member 35b adhered to said piezoelectric member 35a and generating a travelling vibration wave on a driving surface by said oscillation, and a second movable member 36 maintained in pressure contact with the driving surface of said elastic member 35b and driven by said travelling vibration wave.

The first movable member 26 and the second movable member 36 are connected by an output shaft 40. An output difference detecting portion 41, provided on the output shaft 40, detects the difference of the outputs of the first movable member 26 and the second movable member 36. An output difference controlling portion 42 controls the drive signal of the second oscillation portion 31 so as to cancel the difference in the outputs of the first movable member 26 and the second movable member 36, based on the result measurement by the output difference detecting portion 41.

In the following there will be explained the function of the 1st embodiment. The drive signal from the first oscillation portion 21 is transmitted, through the first phase shifting portion 22 and the first amplifying portions 23a, 23b, to the first stator 25, whereby a travelling wave is generated on the driving surface of the 1st stator 25 and the 1st movable member 26 is driven.

The driving of the 1st movable member 26 by the travelling wave is already described, for example, in the Japanese Patent Publication No. 1-17354, and will not, therefore, be explained further.

Also the driving signal from the 2nd oscillation portion 31 is transmitted, through the 2nd phase shifting portion 32 and the 2nd amplifying portions 33a, 33b, to the 2nd stator 35, whereby a travelling wave is generated on the driving surface thereof and the 2nd movable member 36 is driven.

In this state, the output difference detecting portion 41 detects the difference in the outputs of the 1st and 2nd movable members 26, 36 by measuring the amount of elastic deformation, for example, torsion of the output shaft 40. Then the output difference controlling portion 42 corrects the frequency of the drive signal, according to the amount of elastic deformation of the output shaft 40 detected by the output difference detecting portion 41, thereby cancelling the difference in the outputs of the ultrasonic motors 24, 34.

Figure 4:
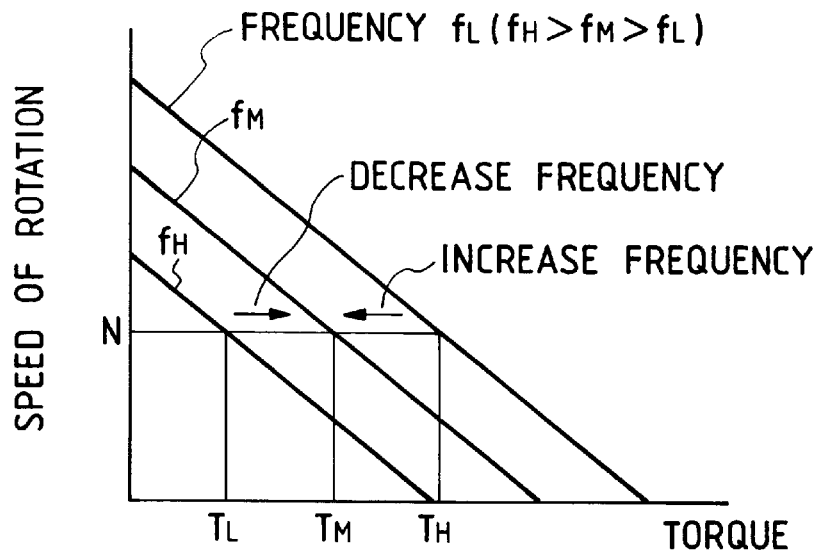
FIGS. 4 and 5 are charts showing the relationship between the torque generated by an ultrasonic motor and the rotating speed thereof.

FIG. 4 is a chart showing the relationship between the torque generated by the ultrasonic motors and the rotating speed thereof in the 1st embodiment.

The relationship of the generated torque and the rotating speed of the ultrasonic motors 24, 34 in the driving frequency range is variable, depending on the frequency. Consequently the generated torque can be increased or decreased respectively by decreasing or increasing the driving frequency.

In this manner the difference in the outputs can be automatically reduced even without the adjustments of the ultrasonic motors 24, 34, and, also in case of varying the rotating speed, the difference in the outputs can be automatically regulated according to the rotating speed.

In the foregoing 1st embodiment, the difference in the outputs of the 1st and 2nd movable members 26, 36 is detected by the output difference detecting portion 41, and the output difference controlling portion 42 accordingly controls the drive signal for the 2nd oscillation portion 31, but the output difference controlling portion 42 may also be so designed to control the drive signals for both the 1st and 2nd oscillation portions 21, 31 in achieving a similar effect of cancelling the difference in the outputs.

In the following, a 2nd embodiment is explained.

In the 2nd embodiment, correction is conducted on the voltage of the drive signal, instead of the frequency thereof in the 1st embodiment.

According to the amount of elastic deformation of the output shaft 40 detected by the output difference detecting portion 41, the output difference controlling portion 42 regulates the voltage of the drive signal, in such a manner as to cancel the difference in the outputs of the ultrasonic motors 24, 34.

Figure 5:
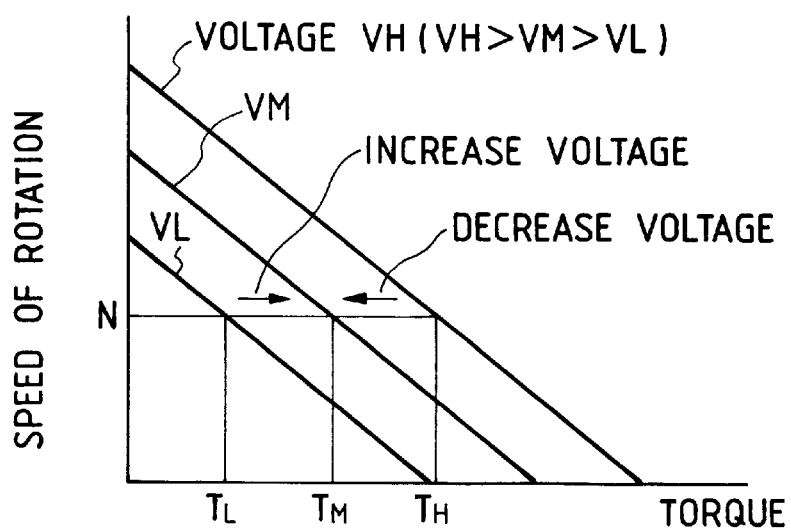

FIG. 5 is a chart showing the relationship between the torque generated by the ultrasonic motors and the rotating speed thereof in the 2nd embodiment.

The relationship between the generated torque and the rotating speed of the ultrasonic motors 24, 34 in the driving frequency range varies depending on the voltage of the drive signals. Consequently the generated torque can be increased or decreased, by respectively increasing or decreasing the input voltage of the drive signal.

In this manner, the difference in the outputs can be automatically decreased even without the adjusting step of the ultrasonic motors 24, 34, and, also when the rotating speed is varied, the difference in the outputs can be automatically regulated according to the rotating speed.

In the following explained is a 3rd embodiment, in which the output difference control of the ultrasonic motors in the 1st embodiment is executed according to the difference in the voltages detected by monitors provided on the piezoelectric members.

In the 3rd embodiment, as shown in FIG. 3, the output difference detecting portion 41 detects the difference between the voltage of an oscillation signal from a mechanoelectrical converting element 25ap provided on the piezoelectric member 25a of the 1st ultrasonic motor 24 and the voltage of an oscillation signal from a mechanoelectrical converting element 35ap provided on the piezoelectric member 35a of the 2nd ultrasonic motor 34. The output difference controlling portion 42 controls the drive signal for the 2nd oscillation portion 31 so as to cancel the difference in the outputs of the 1st and second movable members 26, 36, according to the result of measurement by the output difference detecting portion 41.

Figure 6:
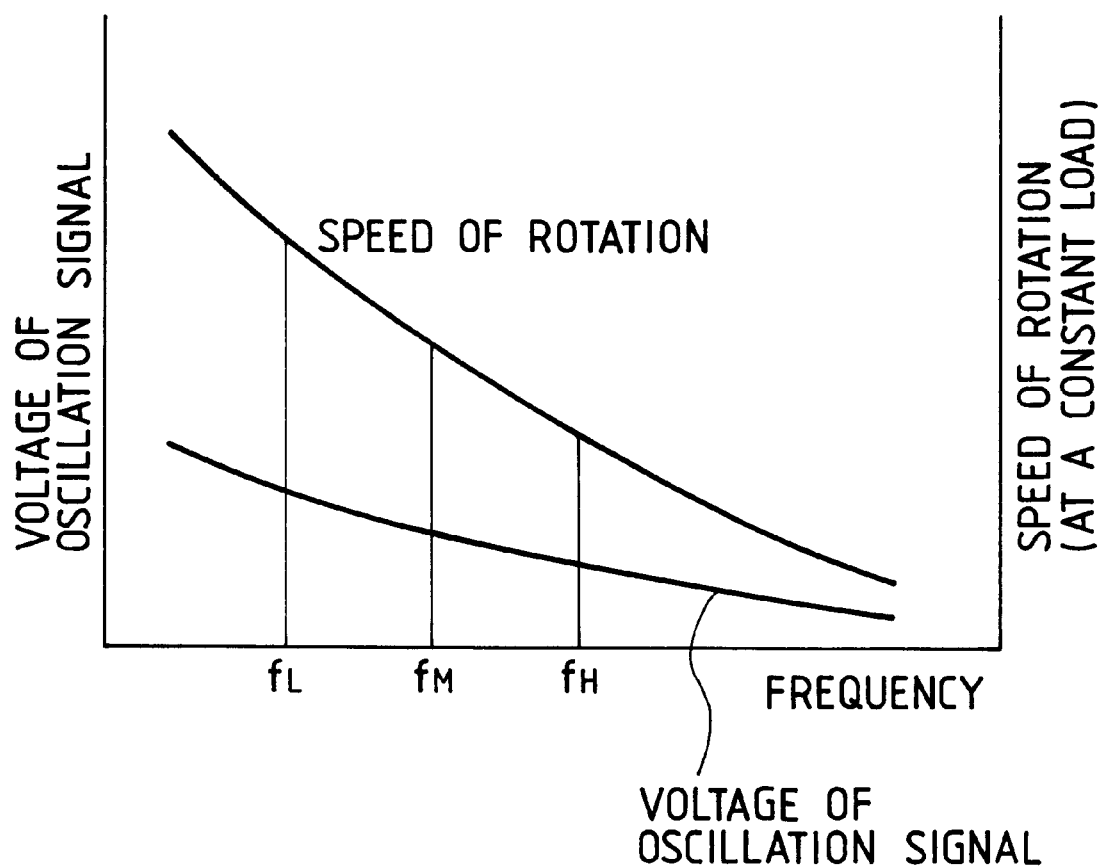
FIG. 6 is a chart showing the relationship among the drive signal frequency, the oscillation signal voltage from a mechanoelectrical converting element, and the rotation speed.

FIG. 6 shows the relationship among the frequency of the drive signal, the voltage of the oscillation signal from the mechanoelectrical converting elements provided on the piezoelectric members and the rotating speed. The rotating speed of each ultrasonic motor under a predetermined load can be detected from the voltage of said oscillation signal. Also the relationship between the generated torque and the rotating speed at a certain frequency approximately assumes the form shown in FIG. 4, so that the generated torque at a certain rotating speed can be detected from the voltage of the oscillation signals from said mechanoelectrical converting elements.

Consequently the difference in the outputs of the two ultrasonic motors can be detected by measuring the difference between the voltages of two oscillation signals.

The output difference controlling portion 42 corrects the frequency of the drive signal, according to the measurement by the output difference detecting portion 41, thereby cancelling the difference in the outputs of the ultrasonic motors 24, 34.

In the following explained is a 4th embodiment, in which the 1st and 2nd ultrasonic motors 24, 34 are so controlled as to generate a predetermined difference in the outputs, instead of generating the same outputs.

In the 4th embodiment, the output difference controlling portion 42 controls the drive signal of the second oscillation portion 31, according to the result of the measurement by the output difference detecting portion 41, so as to generate a predetermined difference in the outputs of the first and second ultrasonic motors 24, 34.

In the present embodiment, the control is executed on the drive signal of the 2nd oscillation portion 31, but such control may also be conducted on the 1st oscillation portion 21 or on both the 1st and 2nd oscillation portions 21, 31.

Figure 7:
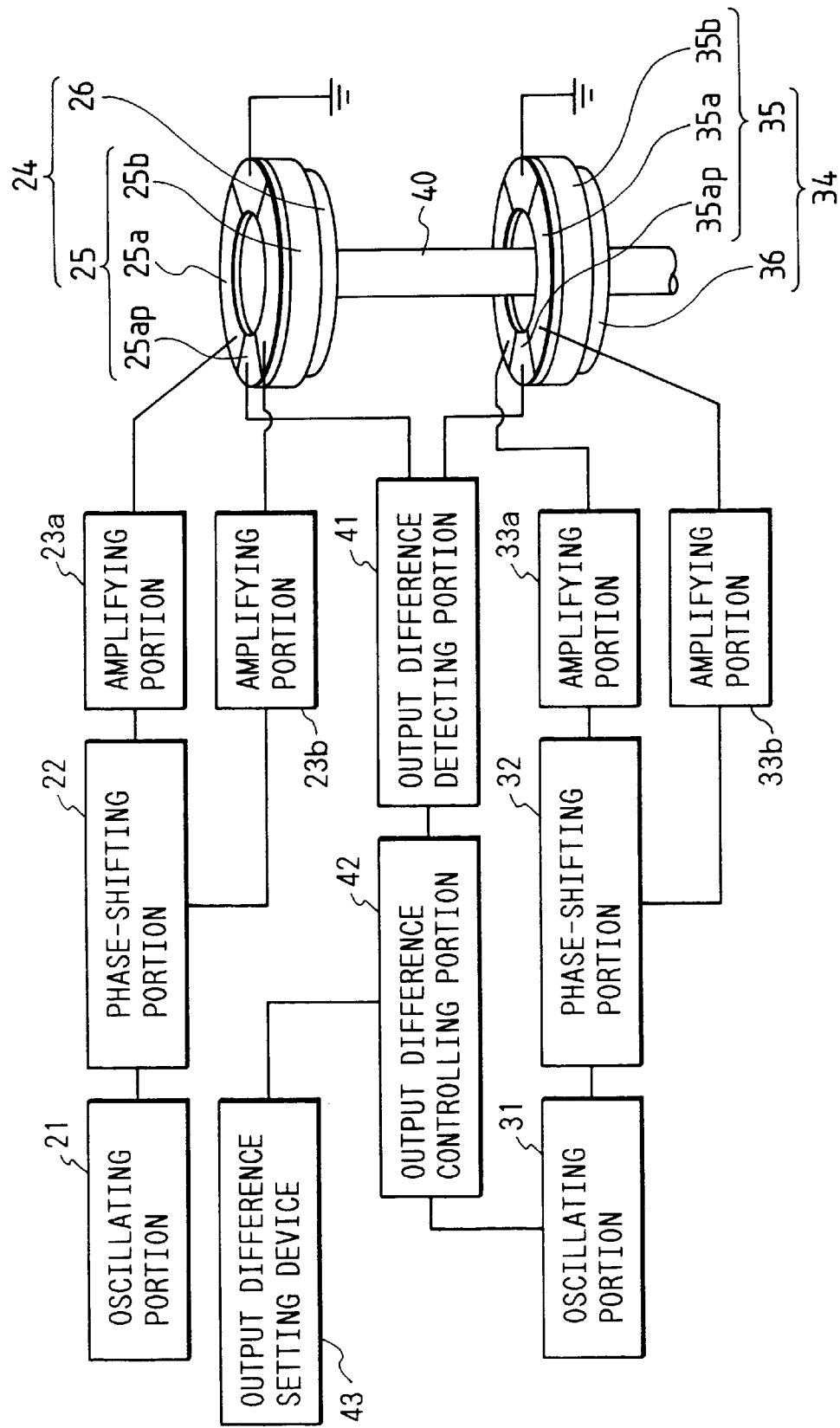
FIG. 7 is a view of a 5th embodiment of the drive control device of the present invention for ultrasonic motors.

FIG. 7 is a block diagram of a 5th embodiment of the drive control device of the present invention, for ultrasonic motors, wherein the same components as those in the foregoing embodiments shown in FIG. 3 are represented by the same numbers and will not be explained further in the following.

In this 5th embodiment, an output difference setting portion 43 is connected to the output difference controlling portion 42.

The output difference detecting portion 41 detects the difference between the voltage of an oscillation signal from a mechanoelectrical converting element 25ap provided on the piezoelectric member 25a of the 1st ultrasonic motor 24, and that of an oscillation signal from a mechanoelectrical converting element 35ap provided on the piezoelectric member 35a of the 2nd ultrasonic motor 34. The output difference setting portion 43 is provided for setting a predetermined output difference between the two ultrasonic motors. The output difference controlling portion 42 controls the drive signal of the 2nd oscillation portion 31, according to the result of measurement by the output difference detecting portion 41, so as to generate the output difference, set by the output difference setting portion 43, between the 1st and 2nd ultrasonic motors 24, 34.

Figure 8:
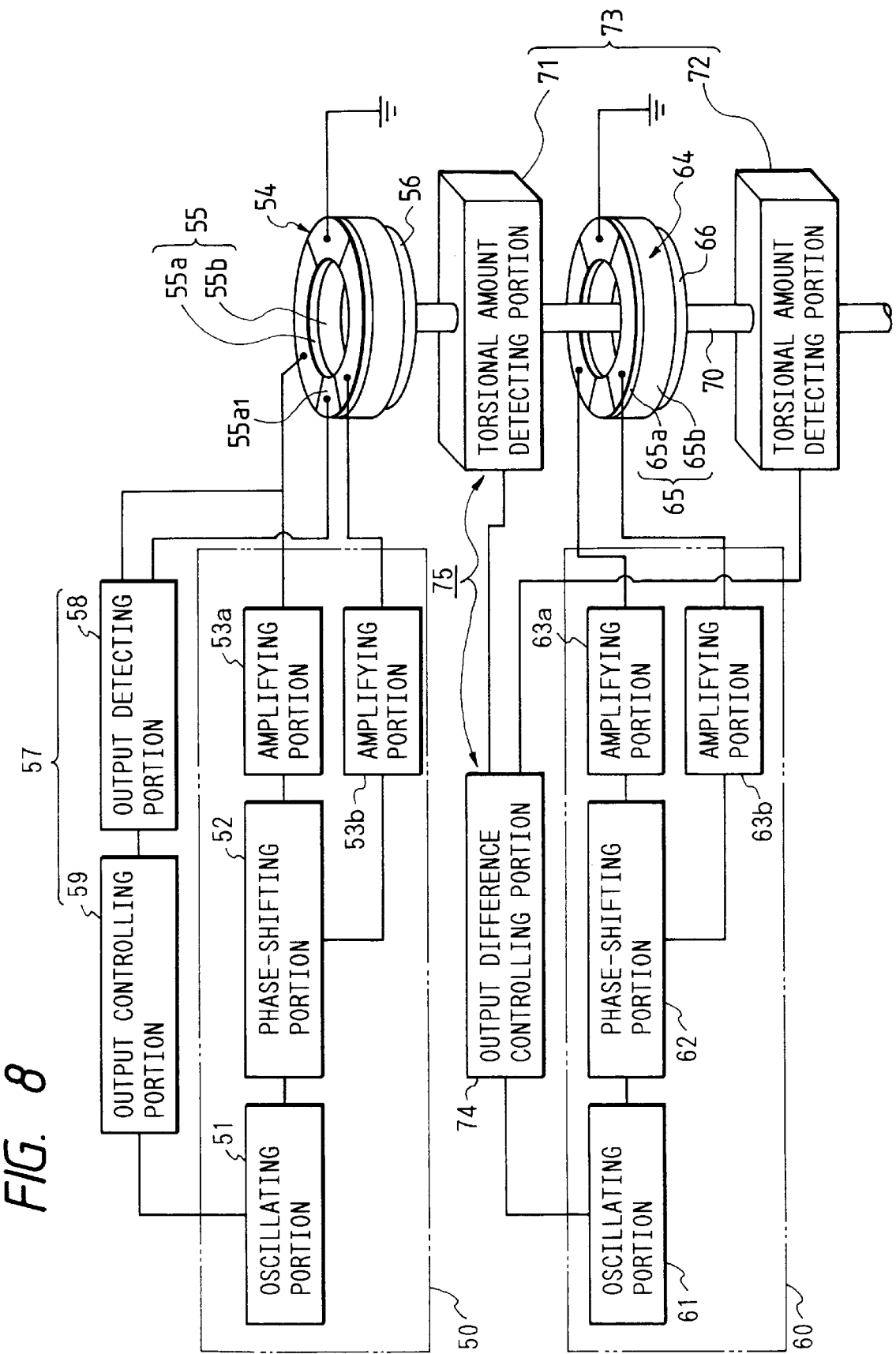
FIG. 8 is a block diagram of a 6th embodiment of the present invention.

FIG. 8 is a block diagram schematically showing a 6th embodiment of the drive control device of the present invention for ultrasonic motors.

The 6th embodiment is capable of controlling, not only the torques generated by the first and second ultrasonic motors, but also the rotating speed of the output shaft.

A 1st driving portion 50 is provided with a 1st oscillation portion 51 generating a drive signal, a 1st phase shifting portion 52 for dividing said drive signal into two drive signals of a mutual phase difference of ¼ wavelength, and first amplifying portions 53a, 53b for respectively amplifying the thus divided drive signals.

A 1st ultrasonic motor 54 comprises a first stator 55 provided with a first piezoelectric member 55a oscillated by the amplified drive signals from the first amplifying portions 53a, 53b and a first elastic member 55b adhered to said piezoelectric member 55a and adapted to generate a travelling vibration wave on a driving surface by said oscillation, and a first movable member 56 maintained in pressure contact with the driving surface of the elastic member 55b and driven by said travelling vibration wave.

A first control portion 57 is provided with an output detecting portion 58 for detecting the phase difference between the monitor voltage wave form in a voltage non-applied position 55a1 of the first piezoelectric member 55a and the input voltage wave form, and an output control portion 59 for releasing an instruction for causing the oscillation portion 51 to correct the frequency of the drive signal, according to the output detection value of the output detecting portion 58.

A 2nd driving portion 60 is provided with a 2nd oscillation portion 61 generating a drive signal, a 2nd phase shifting portion 62 for dividing said drive signal into two drive signals of a mutual phase difference of ¼ wavelength, and second amplifying portions 63a, 63b for respectively amplifying thus divided drive signals.

A 2nd ultrasonic motor 64 comprises a 2nd stator 65 provided with a 2nd piezoelectric member 65a oscillated by the amplified drive signals from the 2nd amplifying portions 63a, 63b and a 2nd elastic member 65b adhered to said piezoelectric member 65a and adapted to generate a travelling vibration wave on a driving surface by said oscillation, and a 2nd movable member 66 maintained in pressure contact with the driving surface of the elastic member 65b and driven by said travelling vibration wave.

The 1st and 2nd movable members 56, 66 and a load portion (not shown) are connected by an output shaft 70. A 1st torsion amount detecting portion 71 detects the torque generated by the 1st ultrasonic wave motor 54, by measuring the amount of torsion of the shaft 70 between the 1st and 2nd movable members 56, 66. A 2nd torsion amount detecting portion 72 detects the sum of the torques generated by the 1st and 2nd ultrasonic motors 54, 64 by measuring the amount of torsion of the shaft 70 between the 2nd movable member 66 and the load portion. In this 6th embodiment, said 1st and 2nd torsion amount detecting portions 71, 72 constitute an output difference measuring portion 73.

An output difference control portion 74 controls the drive signal of the 2nd oscillation portion 61, so as to cancel the difference in the torques generated by the 1st and 2nd ultrasonic motors 54, 64 according to the result of measurement by the output difference measuring portion 73. The output difference measuring portion 73 and the output difference controlling portion 74 constitute a 2nd control portion 75.

In the following there will be explained the functions of the 6th embodiment. The drive signal generated by the 1st oscillation portion 51 is divided in the 1st phase shifting portion 52 into two drive signals of a mutual phase difference of ¼ wavelength, and said two drive signals are respectively amplified by the 1st amplifying portions 53a, 53b and applied to the piezoelectric member 55a of the 1st stator 55, whereby a travelling wave is generated on the driving surface thereof and the 1st movable member 56, maintained in pressure contact with said drive surface, is rotated.

The rotating speed of the 1st movable member 56 can be controlled, as disclosed for example in the Japanese Patent Laid-open Application No. 61-251490, by detecting the phase difference between the monitor voltage wave form in the voltage non-applied part 55a1 of the 1st piezoelectric member 55a and the input voltage wave form, and causing the oscillation portion 51 to correct the frequency of the drive signal, according to the thus detected value.

It is also possible to measure the rotating speed by an encoder provided on the output shaft 70 and to cause the oscillation portion 51 to correct the frequency of the drive signal, through the output control portion 59, according to the thus measured value.

In the present embodiment, the rotating speed of the 1st movable member 56 is controlled by the frequency correction as disclosed in the Japanese Patent Laid-open Application No. 61-251490, but there may also be adopted a method of correcting the voltage of the drive signal.

Also the drive signal generated by the 2nd oscillation portion 61 is divided in the 2nd phase shifting portion 62 into two drive signals of a mutual phase difference of ¼ wavelength, and said two drive signals are respectively amplified in the 2nd amplifying portions 63a, 63b and supplied to the piezoelectric member 66 of the 2nd stator 65, whereby a travelling wave is generated on the driving surface thereof and the 2nd movable member 66 is thus rotated.

The output shaft 70 between the 1st and 2nd movable members 56, 66 generates a torsion corresponding to the torque generated by the 1st ultrasonic motor 54, and the amount of said torsion is detected by the 1st torsion amount detecting portion 71.

Also the output shaft 70 between the 2nd movable member 66 and the load portion generates a torsion corresponding to the sum of the torques generated by the 1st and 2nd ultrasonic motors 54, 64 (or corresponding to the load torque of the load portion), and the amount of said torsion is detected by the 2nd torsion amount detecting portion 72.

The output difference controlling portion 74 functions as to correct the frequency of the drive signal for the 2nd ultrasonic motor 64, according to the results of detection by the torsion amount detecting portions 71, 72, thereby causing the 1st and 2nd ultrasonic motors 54, 64 to generate substantially equal torques.

The driving frequency is decreased or increased, as already explained in relation to FIG. 4 in the 1st embodiment, respectively, when the torque of the 2nd ultrasonic motor 64 is smaller or larger than that of the 1st ultrasonic motor 54.

In this manner the difference in the generated torques can be automatically reduced even without the adjusting step for the ultrasonic motors 54, 64, and, in case of varying the rotating speed, the difference in the generated torques can be automatically regulated according to the rotating speed.

Figure 9:
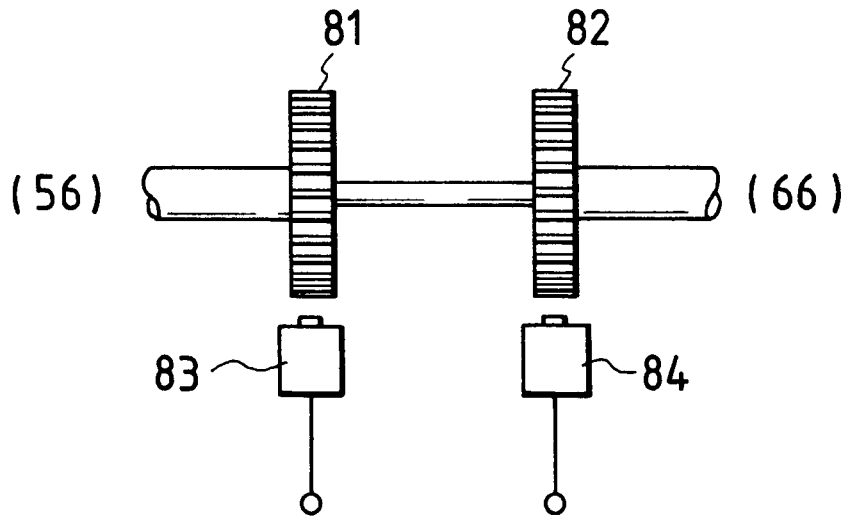
FIG. 9 is a schematic view showing the principle of electromagnetic detection of the shaft torsion.

The amount of torsion of the output shaft 70 can be detected either electromagnetically as shown in FIG. 9, or electrically with a strain gauge provided on the output shaft.

Figure 10:
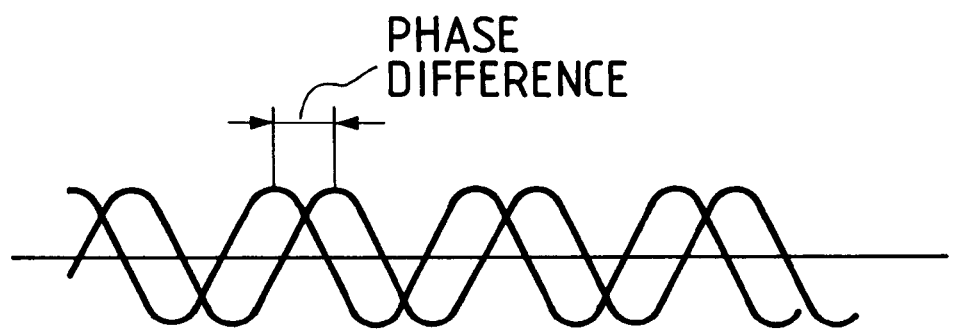
FIG. 10 is a chart showing sinusoidal voltages obtained by an electromagnetic pickup.

The electromagnetic detection will be explained only briefly, as it was already described in the Nikkei Mechanical, Aug. 19, 1991 issue. As shown in FIG. 9, two gears 81, 82 having a same number of teeth are mounted, without the phase difference in the circumferential direction, between the 1st and 2nd movable members 56, 66, whereby sinusoidal voltages are obtained from electromagnetic pickups 83, 84. Thus, the amount of torsion of the shaft 70 can be detected by measuring the aberration between the peaks of said sinusoidal waves, as shown in FIG. 10.

In the following a 7th embodiment is explained, in which correction is made on the voltage of the drive signal, instead of the frequency correction in the 6th embodiment.

In the 7th embodiment, the output difference controlling portion 74 functions as to correct the voltage of the drive signal for the 2nd ultrasonic motor 64 according to the amounts detected by the torsion amount detecting portions 71, 72, thereby causing the 1st and 2nd ultrasonic motors to generate substantially equal torques.

Said voltage of the drive signal is increased or decreased, as already explained in the 2nd embodiment in relation to FIG. 5, respectively if the torque generated by the 2nd ultrasonic motor 64 is smaller or larger than that of the 1st ultrasonic motor 54.

In the following explained is an 8th embodiment.

Figure 11:
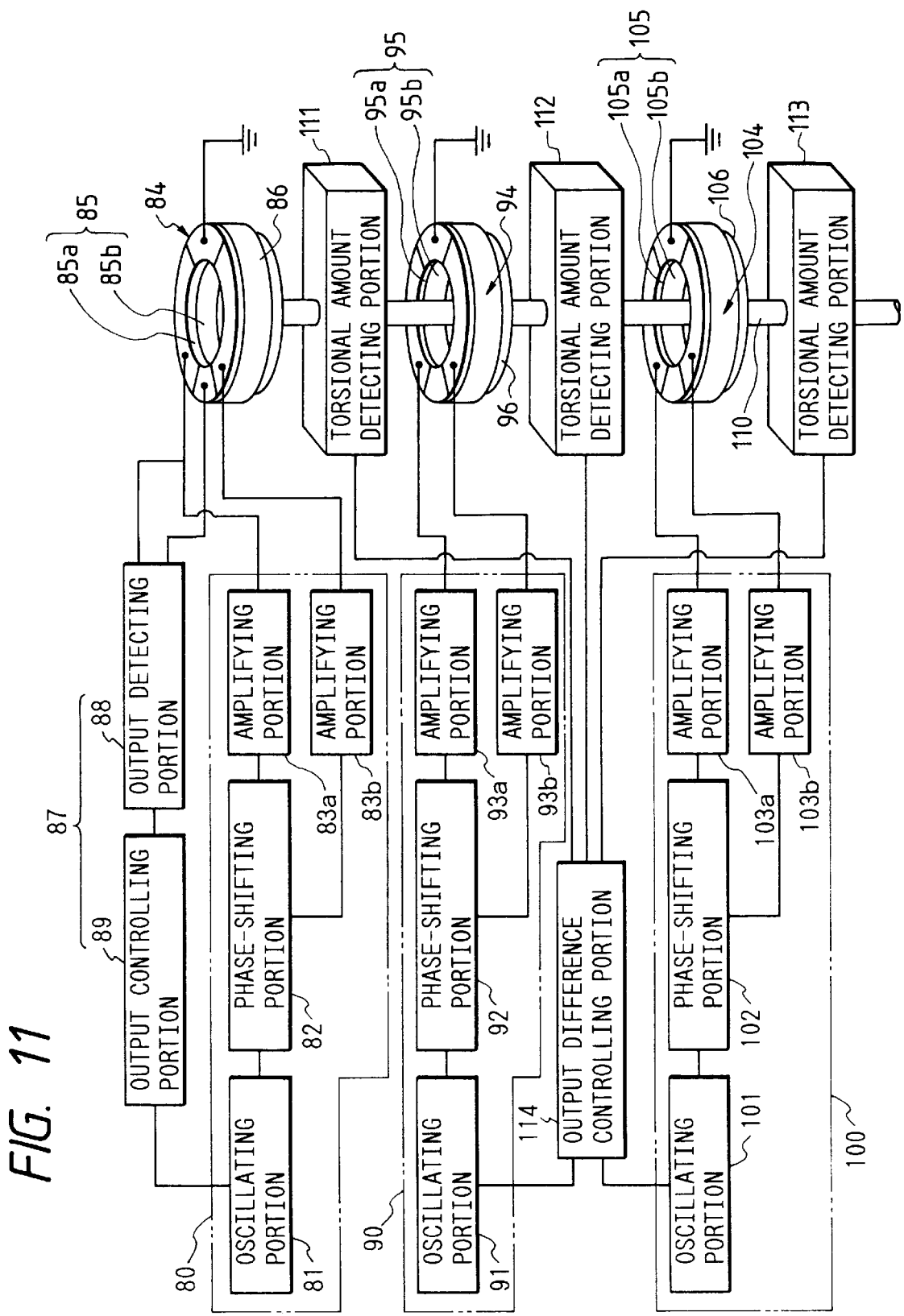
FIG. 11 is a block diagram of an 8th embodiment of the present invention.

FIG. 11 is a block diagram of the 8th embodiment of the drive control device of the present invention, for ultrasonic motors.

The 7th embodiment has described a case in which two ultrasonic motors are connected by a rotary member, but the present invention is applicable also to a case in which three or more ultrasonic motors are connected by a rotary member, as shown in FIG. 11.

A 1st ultrasonic motor 84 is constructed the same as the 1st ultrasonic motor 54 shown in FIG. 8, and 1st–3rd torsion amount detecting portions 111, 112, 113 similar to those employed in the 7th embodiment are provided respectively between 1st and 2nd ultrasonic motors 84, 94, between 2nd and 3rd ultrasonic motors 94, 104 and between 3rd ultrasonic motor and a load portion.

There are detected the load torque of the load portion (sum of the torques generated by the ultrasonic motors 84, 94, 104), the torque generated by the 1st ultrasonic motor, and the sum of the torques generated by the 1st and 2nd ultrasonic motors 84, 94, and the output difference controlling portion 114 corrects the driving frequencies for the 2nd and 3rd ultrasonic motors 94, 104, according to the thus detected values.

In the following explained is a 9th embodiment, in which the voltage of the drive signal is corrected instead of the frequency thereof.

There are detected the load torque of the load portion (or the sum of the torques generated by the 1st to 3rd ultrasonic motors 84, 94, 104), the torque generated by the 1st ultrasonic motor, and the sum of the torques generated by the 1st and 2nd ultrasonic motors 84, 94, and the output difference controlling portion 114 corrects the voltages of the drive signals for the 2nd and 3rd ultrasonic motors 94, 104, according to the thus detected values.

The foregoing 9th embodiment detects the difference in the voltages of the oscillations signals from the mechanoelectrical converting elements provided on the piezoelectric members of two ultrasonic motors, but the difference in the outputs of said motors can also be controlled by the detection of currents entering said motors.

Figure 12:
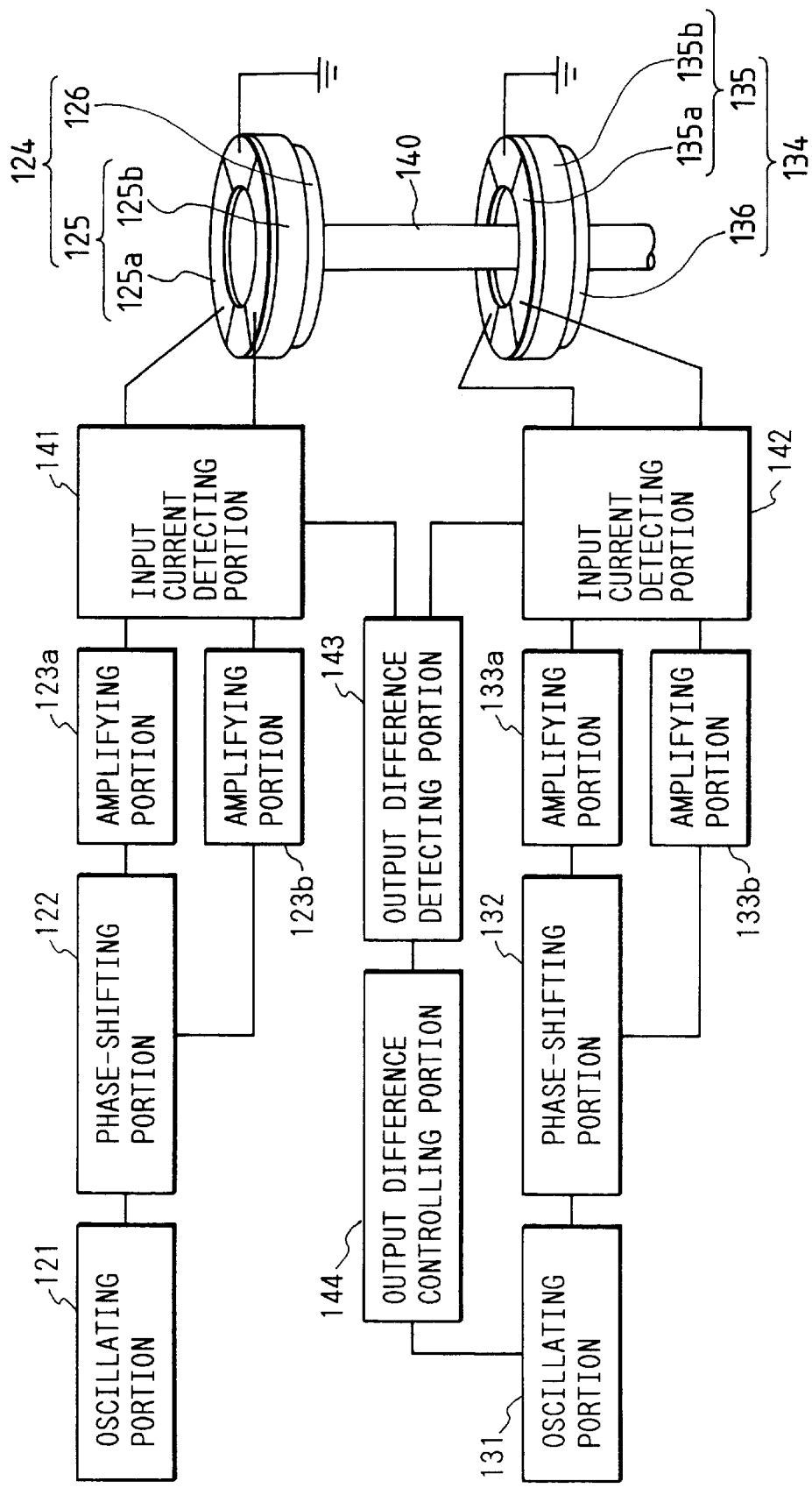
FIG. 12 is a view of a 10th embodiment of the drive control device of the present invention for ultrasonic motors.

In the following, there will be explained a 10th embodiment of the drive control device of the present invention, for ultrasonic motors, with reference to FIG. 12.

A 1st driving portion is provided with a first oscillation portion 121 for generating a drive signal, a 1st phase shifting portion 122 for dividing said drive signal into two, and first amplifying portions 123a, 123b for respectively amplifying the thus divided two drive signals.

A 1st ultrasonic motor 124 comprises a 1st stator 125 provided with a piezoelectric member 125a oscillated by the amplified drive signals from the 1st amplifying portions 123a, 123b and an elastic member 125b adhered to said piezoelectric member 123a and adapted to generate a travelling vibration wave on the driving surface, and a 1st movable member 126 maintained in pressure contact with said driving surface of said elastic member 125b and driven by said travelling vibration wave.

Similarly a 2nd driving portion is provided with a 2nd oscillation portion 131 for generating a drive signal, a 2nd phase shifting portion 132 for dividing said drive signal into two, and 2nd amplifying portions 133a, 133b for respectively amplifying the thus divided two drive signals.

A 2nd ultrasonic motor 134 comprises a 2nd stator 136 provided with a piezoelectric member 135a oscillated by the amplified drive signals from the 2nd amplifying portions 133a, 133b and an elastic member 135b adhered to said piezoelectric member 133a and adapted to generate a travelling vibration wave on the driving surface, and a 2nd movable member 136 maintained in pressure contact with said driving surface of said elastic member 135b and driven by said travelling vibration wave.

The 1st and 2nd movable members 126, 136 are connected by an output shaft 140.

1st and 2nd input current detecting portions 141, 142 respectively detect the currents entering the 1st and 2nd ultrasonic motors 124, 134, and an output difference detecting portion 143 detects the difference between the currents detected by said 1st and 2nd input current detecting portions 141, 142. An output difference controlling portion 144 controls the drive signal of the 2nd oscillation portion 131, so as to cancel the difference in the outputs of the 1st and 2nd movable members 126, 136, according to the result of measurement by the output difference detecting portion 143.

In the following there will be explained the function of the 10th embodiment. The drive signal from the 1st oscillation portion 121 is transmitted, through the 1st phase shifting portion 122 and first amplifying portions 123a, 123b, to the first stator 125, whereby a travelling vibration wave is generated on the driving surface thereof and the 1st movable member 126 is driven.

Also the drive signal from the 2nd oscillation portion 131 is transmitted, through the 2nd phase shifting portion 132 and the 2nd amplifying portions 133a, 133b, to the 2nd stator 135, whereby a travelling vibration wave is generated on the driving surface thereof and the 2nd movable member 136 is driven.

Figure 13:
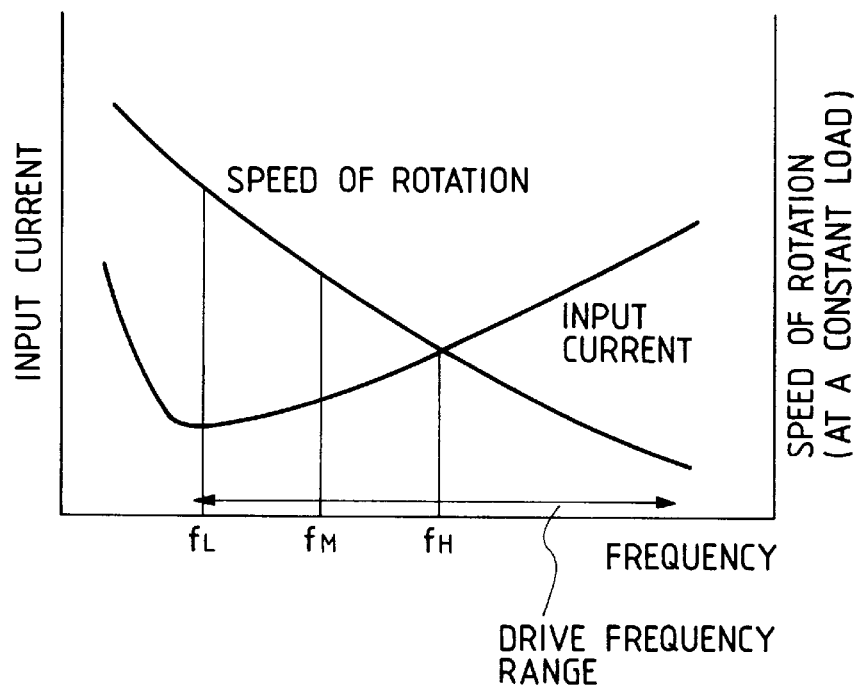
FIG. 13 is a chart showing the relationship among the drive signal frequency, the input current and the rotating speed.

The output difference detecting portion 143 detects the difference in the outputs of the 1st and 2nd movable members 126, 136 by calculating the difference between the currents entering the 1st and 2nd ultrasonic motors 124, 134. FIG. 13 shows the relationship among the frequency of the drive signal, the input current and the rotating speed. Within the driving frequency range, the rotating speed under a predetermined load can be determined from the input current. The relationship between the rotating speed and the generated torque is approximately as shown in FIG. 4 or 5, so that the difference in the outputs of the two ultrasonic motors can be detected by the measurement of the difference in the input currents to the two ultrasonic motors. The output difference controlling portion 144 corrects the frequency of the voltage of the drive signal according to the result of measurement by the output difference detecting portion 143, thereby cancelling the difference in the outputs of the ultrasonic motors 124, 134.

Figure 14:
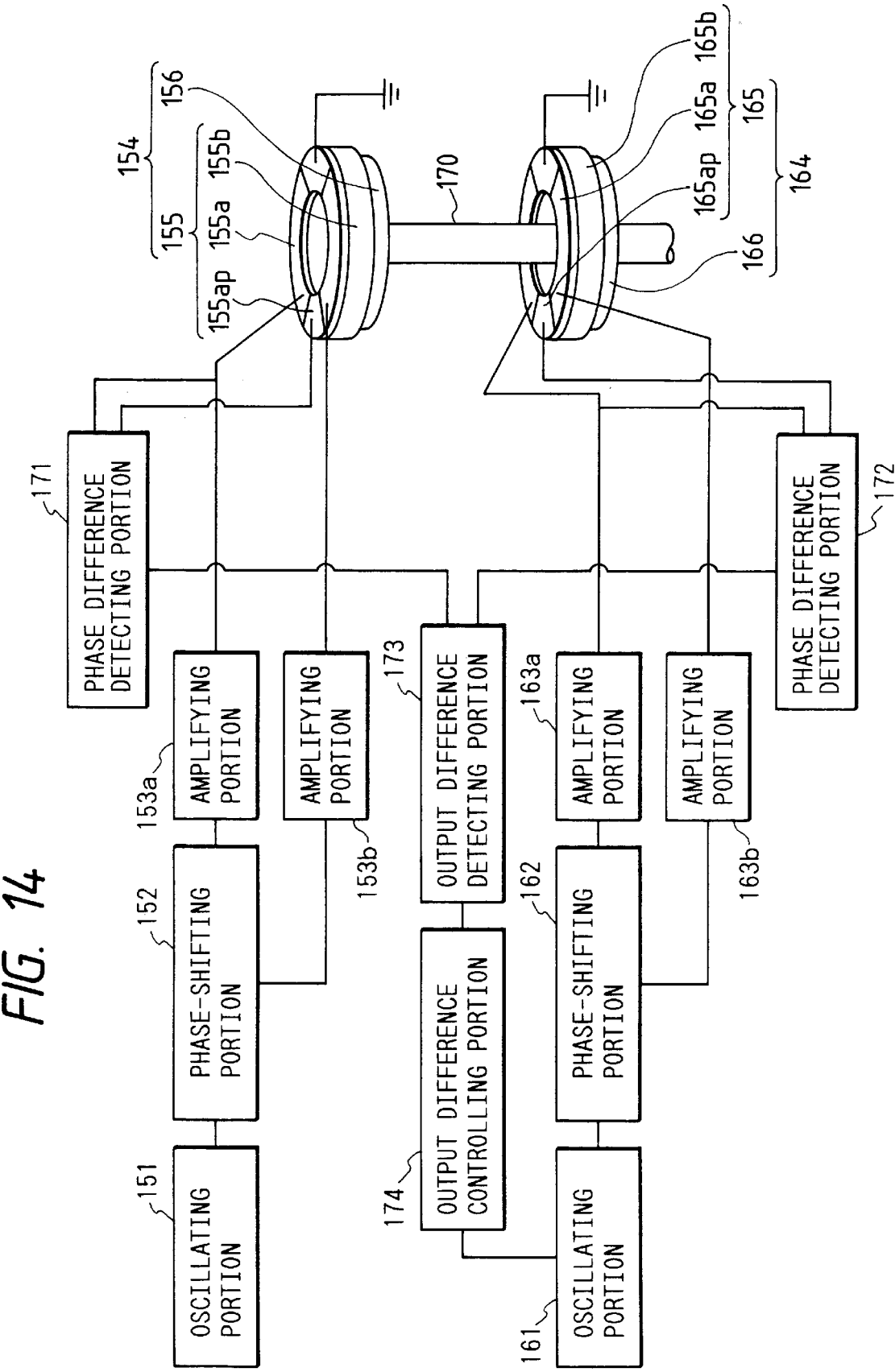
FIG. 14 is a view of an 11th embodiment of the drive control device of the present invention for ultrasonic motors.

In the following there will be explained an 11th embodiment of the drive control device of the present invention, for the ultrasonic motors, with reference to FIG. 14.

The difference in the outputs of two ultrasonic motors can also be controlled by detecting the difference between the phase difference between the drive signal entering the first ultrasonic motor and the oscillation signal from a mechanoelectrical converting portion provided on the vibration member of said first ultrasonic motor, and the phase difference between the drive signal entering the second ultrasonic motor and the oscillation signal from a mechanoelectrical converting portion provided on the vibration member of said second ultrasonic motor.

A first driving portion is provided with a first oscillation portion 151 for generating a drive signal, a 1st phase shifting portion 152 for dividing said drive signal into two, and first amplifying portions 153a, 153b for respectively amplifying thus divided two drive signals.

A 1st ultrasonic motor 154 comprises a 1st stator 155 including a piezoelectric member 155a oscillated by the amplified drive signals from the 1st amplifying portions 153a, 153b, and an elastic member 155b adhered to said piezoelectric member 155a and adapted to generate a travelling vibration wave on the driving surface by said oscillation, and a 1st movable member 156 maintained in pressure contact with the driving surface of said elastic member 155b and driven by said travelling vibration wave.

Similarly a 2nd driving portion is provided with a 2nd oscillation portion 161 for generating a drive signal, a 2nd phase shifting portion 162 for dividing said drive signal into two, and 2nd amplifying portions 163a, 163b for respectively amplifying thus divided two drive signals.

A 2nd ultrasonic motor 164 comprises a 2nd stator 165 including a piezoelectric member 165a oscillated by the amplified drive signals from the 2nd amplifying portions 163a, 163b, and an elastic member 165b adhered to said piezoelectric member 165a and adapted to generate a travelling vibration wave on the driving surface by said oscillation, and a 2nd movable member 166 maintained in pressure contact with the driving surface of said elastic member 165b and driven by said travelling vibration wave.

The 1st and 2nd movable members 156, 166 are connected by an output shaft 170.

A 1st phase difference detecting portion 171 detects the phase difference between the drive signal entering the first ultrasonic motor 154 and the oscillation signal released from the mechanoelectrical converting element 155ap provided in a voltage non-applied part of the piezoelectric member 155a of said 1st ultrasonic motor 154. Also a 2nd phase difference detecting portion 172 detects the phase difference between the drive signal entering the 2nd ultrasonic motor 164 and the oscillation signal released from the mechanoelectrical converting element 165ap provided in a voltage non-applied part of the piezoelectric member 165a of the 2nd ultrasonic motor 164. The output difference detecting portion 173 detects the difference between the phase differences detected by the 1st and 2nd phase difference detecting portions 171, 172. The output difference controlling portion 174 controls the drive signal of the 2nd oscillation portion 161, so as to cancel the difference in the outputs from the 1st and 2nd movable members 156, 166, according to the result of measurement by the output difference detecting portion 173.

In the following there will be explained the functions of this 11th embodiment. The drive signal from the 1st oscillation portion 151 is transmitted, through the 1st phase shifting portion 152 and the 1st amplifying portions 153a, 153b, to the 1st stator 155, whereby a travelling vibration wave is generated on the driving surface thereof and the 1st movable member 156 is driven.

Also the drive signal from the 2nd oscillation portion 161 is transmitted, through the 2nd phase shifting portion 162 and the 2nd amplifying portions 163a, 163b, to the 2nd stator 165, whereby a travelling vibration wave is generated on the driving surface thereof and the 2nd movable member 166 is driven.

In this state, the 1st phase difference detecting portion 171 detects the phase difference between the drive signal entering the 1st ultrasonic motor 154 and the oscillation signal released from the mechanoelectrical converting element 155ap provided in the voltage non-applied part of the piezoelectric member 155a of the 1st ultrasonic motor 154, while the 2nd phase difference detecting portion 172 detects the phase difference between the drive signal entering the 2nd ultrasonic motor 164 and the oscillation signal released from the mechanoelectrical converting element 165ap provided in the voltage non-applied part of the piezoelectric member 165a of the 2nd ultrasonic motor 164, and the output difference detecting portion 173 detects the difference between the phase differences detected by the 1st and 2nd phase difference detecting portions 171, 172.

Figure 15:
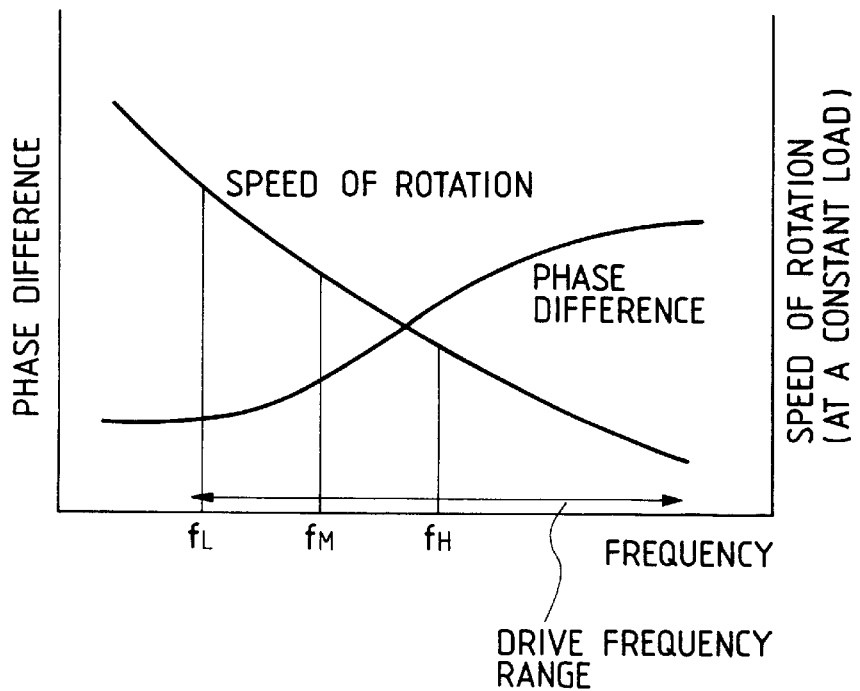
FIG. 15 is a chart showing the relationship among the drive signal frequency, the phase difference and the rotating speed.

FIG. 15 shows the relationship among the frequency of the drive signal, the phase difference and the rotating speed. Within the driving frequency range, the rotating speed under a predetermined load can be determined from the phase difference. Also the relationship between the rotating speed and the generated torque is approximately as shown in FIGS. 4 and 5, so that the difference in the outputs of two ultrasonic motors can be detected by measuring the phase difference between two motors. The output difference controlling portion 174 corrects the frequency or voltage of the drive signal according to the result of measurement by the output difference detecting device 173, thereby cancelling the difference in the outputs of the ultrasonic motors 154, 164.

The foregoing 1st to 11th embodiments have described drive control devices for ultrasonic motors for driving a rotary member, but the present invention is likewise applicable to linear motors.

Figure 16:
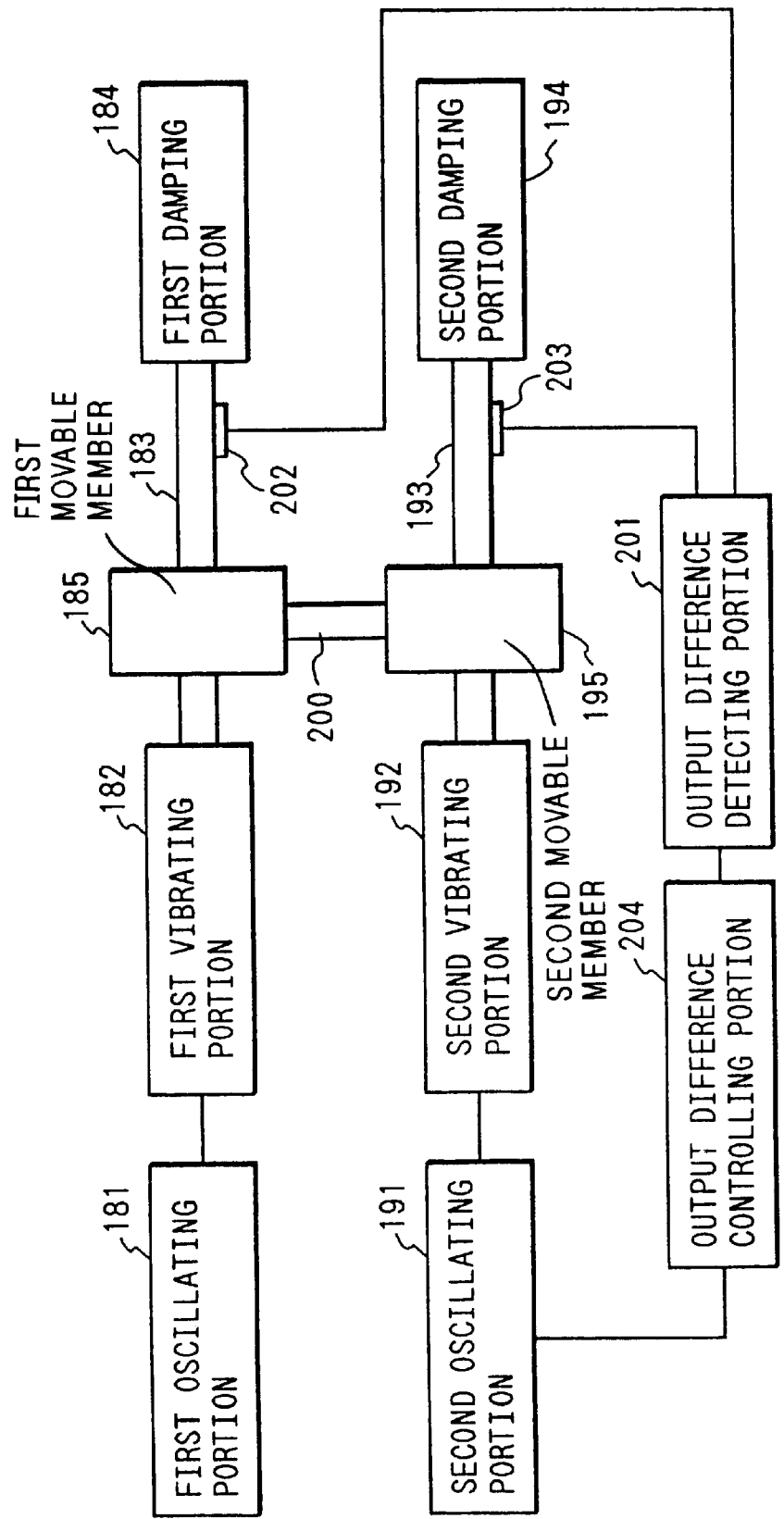
FIG. 16 is a view of a 12th embodiment of the drive control device of the present invention for ultrasonic motors.

In the following there will be explained, with reference to FIG. 16, a 12th embodiment of the drive control device of the present invention, applied to linear ultrasonic motors.

A 1st driving portion is provided with a 1st oscillation portion 181 for generating a drive signal.

A 1st linear ultrasonic motor comprises a 1st stator including a 1st vibrating portion 182 for generating a travelling vibration wave on an elastic member by said drive signal, a 1st damping portion 184 positioned opposite to said 1st vibrating portion 182 across said elastic member 183 and adapted to absorb said vibration wave of the elastic member 183, and said 1st elastic member 183 vibrated by said 1st vibrating portion 182 and adapted to generate a travelling vibration wave on the driving surface; and a 1st movable member 185 maintained in pressure contact with the driving surface of said elastic member 183 and moved by said travelling vibration wave.

Similarly a 2nd driving portion is provided with a 2nd oscillation portion 191 for generating a drive signal.

A 2nd linear ultrasonic motor comprises a 2nd stator including a 2nd vibrating portion 192 for generating a travelling vibration wave on an elastic member by said drive signal, a 2nd damping portion 184 positioned opposite to said 2nd vibrating portion 192 across said elastic member 193 and adapted to absorb said vibration wave of the elastic member 193, and said 2nd elastic member 193 vibrated by said 2nd vibrating portion 192 and adapted to generate a travelling vibration wave on the driving surface; and a 2nd movable member 195 maintained in pressure contact with the driving surface of said elastic member 193 and moved by said travelling vibration wave.

The 1st and 2nd movable members 185, 195 are connected by a connecting portion 200. An output difference detecting portion 201 detects the difference between the voltages of the oscillation signals respectively released from mechanoelectrical converting elements 202, 203 provided on the 1st and 2nd elastic members 183, 193, and an output difference controlling portion 204 controls the drive signal of the 2nd oscillation portion 191, according to the result of detection by the output difference detecting portion 201 so as to cancel the difference in the outputs of the 1st and 2nd movable members 185, 195.

In the following there will be explained the functions of the 12th embodiment. The drive signal from the 1st oscillation portion 181 is transmitted to the 1st vibrating portion 182, which generates a travelling vibration wave on the elastic member 183, thereby driving the 1st movable member 185. Said travelling vibration wave, generated by the 1st vibrating portion 182, propagates along the elastic member 183, and, upon reaching the end thereof, generates a reflected wave which distorts the wave form of said vibration wave from the 1st vibrating portion 182. For this reason the 1st damping portion 184 is provided for absorbing said travelling vibration wave.

Also the drive signal from the 2nd oscillation portion 191 is transmitted to the 2nd vibrating portion 194, which generates a travelling vibration wave in the elastic member 193, thereby driving the 2nd movable member 195. Said travelling vibration wave, generated by the 2nd vibrating portion 192, propagates along the elastic member 193, and, upon reaching the end thereof, generates a reflected wave which distorts the wave form of said vibration wave from the 2nd vibrating portion 192. For this reason the 2nd damping portion 194 is provided for absorbing said travelling vibration wave.

In this state the output difference detecting portion 201 detects the difference in the outputs of the 1st and 2nd movable members 185, 195, by measuring the difference between the voltage of the oscillation signal from the mechanoelectrical converting portion 202 provided on the 1st elastic member 183 and that from the mechanoelectrical converting portion 203 provided on the 2nd elastic member 193, and the output difference controlling portion 204 functions to correct the frequency or voltage of the drive signal, according to the result measured by the output difference detecting portion 201, in such a manner as to cancel the difference in the outputs of the linear ultrasonic wave motors.

The 1st to 11th embodiments have described the control of plural ultrasonic motors connected, for example, by a connecting shaft, but the present invention is also applicable to a case of driving plural ultrasonic motors without such connection.

In the following explained is a 13th embodiment of the present invention, with reference to FIGS. 2 and 17.

Said 13th embodiment is an application of the 5th embodiment to a transporting equipment.

In a transporting equipment 11 as shown in FIG. 2, with two driving wheels 9, 10 respectively driven by two ultrasonic motors 7, 8, the torques and the rotating speeds of the two driving wheels 9, 10 have to be mutually the same in case of linear advancement. Consequently the two ultrasonic motors 7, 8 have to provide mutually same torques and have to be driven with mutually same rotating speeds. On the other hand, in case of turning for example to the left, the torque and the rotating speed of the right-hand driving wheel 9 have to be larger than those of the left-hand driving wheel 10. Consequently the ultrasonic motor 7 at the right have to have a torque and a rotating speed larger than those of the motor 8 at the left.

In case of straight advancement, the output difference setting portion 43 shown in FIG. 7 is set at a difference "0", whereby the two ultrasonic wave motors 7, 8 provide substantially same torques and rotating speeds, thus providing substantially equal torques and rotating speeds from the two driving wheels 9, 10. Also in case of turning, there is set an output difference, whereby obtained is a difference between the torques or the rotating speeds of the two ultrasonic wave motors 7, 8, thus generating a difference in the torques or the rotating speeds of the two driving wheels 9, 10.

In the following there will be explained, with reference to FIG. 17, the process from the detection of the output difference to the control of the oscillation portion, in the 3rd embodiment.

Terminals (1), (2) are respectively connected to the mechanoelectrical converting elements 25$ap$, 25$ap$ and 35$ap$ provided on the piezoelectric members 25$a$, 35$a$ of the 1st and 2nd ultrasonic motors 24, 34 shown in FIG. 3, respectively receive the voltages of the oscillation signals of the stators 25, 35 of said 1st and 2nd ultrasonic motors.

The difference of said voltages V1, V2 can be regarded, as already explained in relation to FIG. 6, as the difference in the outputs (generated torques) of the 1st and 2nd ultrasonic motors 24, 34. Consequently said difference can be utilized to match the output of the 2nd ultrasonic motor 34 substantially with that of the 1st ultrasonic motor 24.

Figure 17:
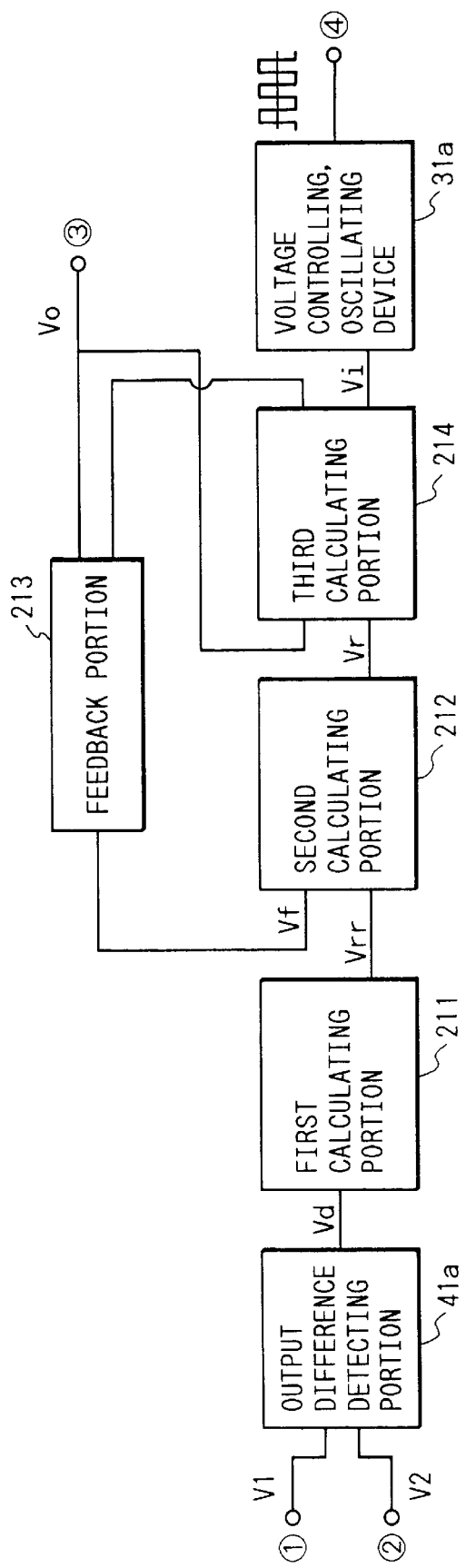
FIG. 17 is a view showing the output control for the second ultrasonic motor in a 3rd embodiment.

As shown in FIG. 17, the difference between said voltages V2, V1 is calculated by the output difference output portion 41$a$ (Vd=V1-V2). The obtained result Vd (=V1-V2) becomes positive or negative, respectively, if the generated torque is larger in the first motor 24 or in the 2nd motor 34. Said value Vd indicates the relative amount of correction with respect to the torque currently generated by the 2nd ultrasonic motor 34, and increases in the absolute value as the difference in the oscillation voltages increases. Said voltage Vd is multiplied by a coefficient $-1 \times a$ in a 1st calculating portion 211 in order to elevate said voltage to a control voltage. The obtained value Vrr (=$-1 \times a \times$Vd) indicates a relative amount of correction with respect to the current output of the 2nd ultrasonic motor 34, and becomes larger in the absolute value as the difference in the alternating voltages (equivalent to the generated torques) increases.

Then a 2nd calculating portion 212 adds said correction amount Vrr to a voltage Vf from a feedback portion 213 to obtain an absolute correction amount Vr (=Vrr+Vf) with respect to a reference voltage Vo. Then a 3rd calculating portion 214 adds Vr and the reference voltage Vo from a terminal (3), thereby obtaining a value Vi (=Vo+Vr) for supply to a voltage-controlled oscillator 31$a$ constituting the oscillation portion 31.

The voltage-controlled oscillator 31$a$ supplies a signal of a frequency corresponding to Vi to a terminal (4), for supply to an unrepresented wave shaping portion, thereby varying the generated torque and the rotating speed of the 2nd ultrasonic motor 34. Then the oscillation signal voltages of both ultrasonic motors are entered from the terminals (1) and (2), and the voltage Vrr is calculated.

On the other hand, the feedback portion 213 receives Vi from the 3rd calculating portion 214, calculates the difference thereof from the reference voltage Vo, and returns said difference Vf (=Vi−Vo) to the 2nd calculating portion 212, which adds said Vf and the reentered Vrr. Then the 3rd calculating portion 214 obtains Vi by adding the reference voltage Vo.

In the following there will be explained the correction of the output difference of the 1st and 2nd ultrasonic motors 24, 34 according to the 3rd embodiment.

At first there is assumed a case in which the torque generated by the 2nd ultrasonic motor 34 is smaller. In such case the frequency of the drive signal for the 2nd ultrasonic motor is reduced, in order to increase the generated torque at a certain rotating speed. In the present case, since V1 is larger than V2, Vd becomes negative, so that Vrr also becomes negative, thereby reducing Vr and Vi. Consequently the frequency of the drive signal from the voltage-controlled oscillator 31a becomes smaller.

Then let us consider a case in which the torque generated by the 2nd ultrasonic motor 34 is larger. In this case, the frequency of the drive signal for the 2nd ultrasonic motor is increased, thereby reducing the generated torque at a certain rotating speed. Since V1 is smaller than V2, Vd becomes positive. Consequently Vrr also becomes positive, thus increasing Vr and Vi. Consequently the frequency of the drive signal from the voltage-controlled oscillator 31a increases.

In the 3rd embodiment, the oscillation portion 31 is controlled by a variation in the frequency of the drive signal, but such control can also be achieved by a variation in the voltage of the drive signal.

FIG. 5 shows the relationship between the generated torque and the rotating speed of the ultrasonic wave motor. Said relationship between the generated torque and the rotating speed of the ultrasonic motors 24, 34 at a certain driving frequency varies depending on the voltage of the drive signal. Consequently the generated torque can be increased or decreased respectively by an increase or a decrease in the voltage of the drive signal.

In the following there will be explained a method of voltage control, with reference to FIG. 18.

Terminals (1), (2) are respectively connected to mechanoelectrical converting elements 25ap, 35ap provided on the piezoelectric members 25a, 35a of the 1st and 2nd ultrasonic motors 24, 34, and respectively receive the voltages of the oscillation signals of the stators 25a, 35a of the 1st and 2nd ultrasonic motors 24, 34.

The difference of said voltages V1, V2 can be regarded, as already explained with reference to FIGS. 4 and 6, as the difference in the outputs of the 1st and 2nd ultrasonic motors 24, 34. Consequently said difference of the voltages V2 and V1 can be utilized for matching the output of the 2nd motor 34 substantially with that of the 1st motor 24.

The difference between said voltages V2 and V1 is calculated by the output difference detecting portion 41a. The obtained result Vd (=V1−V2) becomes positive or negative, respectively, if the generated torque is larger in the 1st motor 24 or in the 2nd motor 34. Said value Vd indicates the relative amount of correction with respect to the current output of the 2nd motor 34, and becomes larger in the absolute value as the difference of the oscillation signals increases. Said voltage Vd is multiplied by a coefficient a in a 1st calculating portion 221 in order to elevate said voltage to a control voltage. Thus obtained value Vrr (=a×Vd) indicates a relative amount of correction with respect to the current output of the 2nd ultrasonic motor 34, and becomes larger in the absolute value as the difference in the alternating voltages (or generated torques) increases.

Then a 2nd calculating portion 222 adds said correction amount Vrr to a voltage Vf from a feedback portion 223 to obtain an absolute correction amount Vr (=Vrr+Vf) with respect to a reference voltage Vo. Then a 3rd calculating portion 224 adds Vr and the reference voltage Vo from a terminal (3), thereby obtaining a value Vi (=Vr+Vo) for supply to an A/D converter 225 and a feedback portion 223.

The A/D converter 225 sends a digital signal Sd, corresponding to Vi, to an amplification gain controlling portion 226, which in turns sends a control signal Ss, corresponding to Sd, to an amplifying portion 31b. Said amplifying portion 31b amplifies the drive signal, from the oscillation portion 31a of the 2nd oscillation portion 31, with an amplifying gain corresponding to the control signal Ss. If Va is larger or smaller, the amplifying gain in the amplifying portion 31b is respectively increased or decreased.

The 2nd oscillation portion 31 comprises the oscillation portion 31a and the amplifying portion 31b, wherein the drive signal from said oscillation portion 31a is amplified in said amplifying portion with an amplification gain selected therein and transmitted to the phase shifting portion (not shown in this figure).

On the other hand, the feedback portion 223 receives Vi from the 3rd calculating portion 224, then calculates the difference from the reference voltage Vo, and returns the result Vf (=Vi−Vo) to the 2nd calculating portion 222, which adds Vf and the re-entered Vrr. Then the 3rd calculating portion 224 adds the reference voltage Vo to release Vi.

Figure 19:
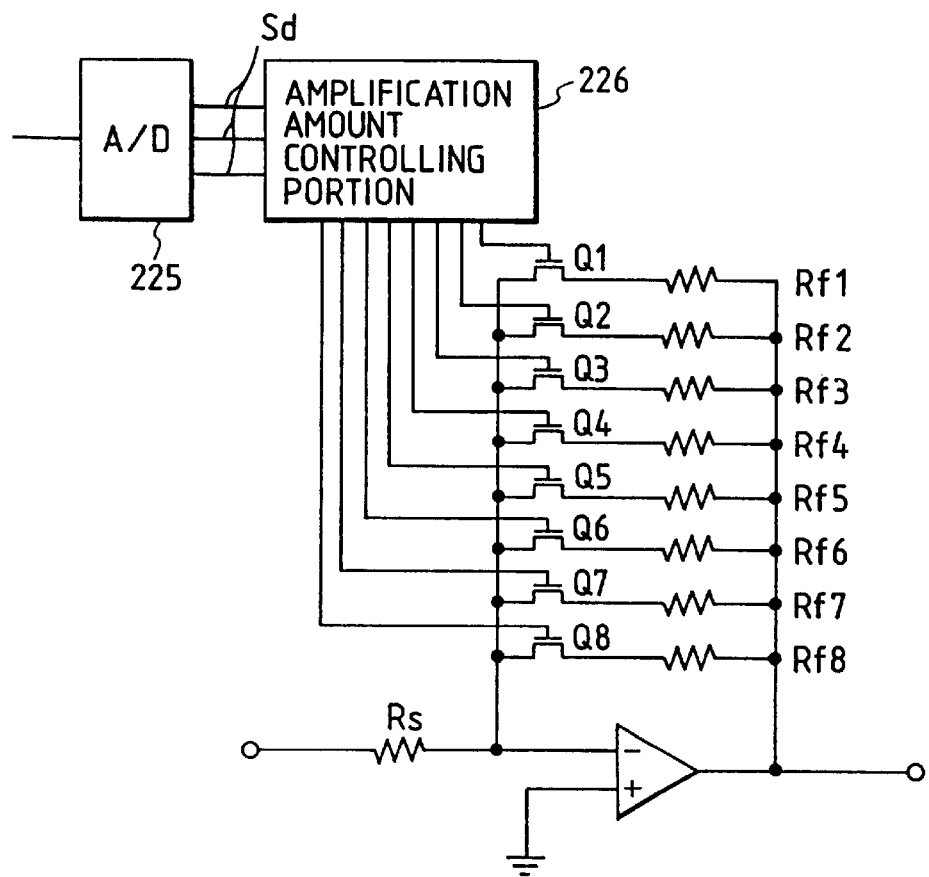
FIG. 19 is a view showing the method for selecting the amount of amplification for the drive signal.

FIG. 19 shows a method for selecting the gain of amplification of the drive signal.

An amplification amount controlling portion 226 comprises of a control signal generating portion, such as a multiplexer, capable of signal selection and generation of a control signal, and switching elements Q1–Q8 such as MOSFETs to be turned on and off by said control signal. The control signal generating portion receives the digital signal Sd from the A/D converter 225, selects one of the switching elements Q1–Q8 according to Sd, and transmits an ON signal to the selected switching element, which opens a feedback path in one of resistors Rf1–Rf8 connected to an operational amplifier.

The feedback path of the operational amplifier contains a parallel connection of resistors Rf1–Rf8 of mutually different resistances, which are respectively connected in series to the switching elements Q1–Q8, one of which is turned on by the control signal from the control signal generating portion, whereby the amplification amount of the operational amplifier is determined.

In the present embodiment, for the ease of understanding, the digital signal from the A/D converter 225 is assumed to be of 8 bits, and there are employed eight switching elements and eight resistors Rf. It is however possible also to employ a 4-bit digital signal from the A/D converter 225 and to employ four switching elements and four resistors Rf, or to employ a 16-bit digital signal and to employ 16 switching elements and 16 resistors Rf, or an even larger number of switching elements and resistors. A larger number of bits, switching elements and resistors enable finer control.

In the following there is considered the correction of the difference in the torques generated by the 1st and 2nd ultrasonic motors.

At first considered is a case in which the torque generated by the 2nd ultrasonic motor 34 is smaller. In such case the input voltage of the drive signal to the 2nd ultrasonic motor 34 is increased, thereby increasing the torque generated at a certain rotating speed. Since V1 is larger than V2 in this case, Vd becomes positive. Consequently Vrr becomes positive also, thus enlarging Vr and Vi, whereby a signal increasing the amplification gain in the A/D converter 225 is transmitted to the amplification gain controlling portion 226, which turns on one of the switching elements Q1–Q8, connected to a resistor capable of increasing the amplification gain, whereby the voltage of the drive signal from the oscillation portion 31a increases.

On the other hand, if the torque generated by the 2nd motor 34 is larger, the input voltage of the drive signal therefor is reduced, thereby decreasing the torque generated at a certain rotating speed. Since V1 is smaller than V2 in this case, Vd becomes negative. Consequently Vrr also becomes negative, thereby reducing Vr and Vi. Thus a signal reducing the amplification gain in the A/D converter 225 is transmitted to the amplification gain controlling portion 226, which thus turns on one of the switching elements Q1–Q8, thus selecting a resistor reducing the amplification gain, whereby the voltage of the drive signal from the oscillation portion 31a decreases.

In the foregoing there has been explained control on the frequency or the voltage of the drive signal from the oscillation portion 31, but the control may also be conducted on both frequency and voltage. Such control method will be explained in the following, with reference to FIG. 20.

The method of control is similar to that explained in relation to FIG. 17, but the procedure after the 3rd calculating portion 214 has to be modified as follows.

The output value Vi from the 3rd calculating portion 214 is supplied to the oscillation portion 31 and the A/D converter 227. In the oscillation unit 31, said output signal is transmitted to the voltage-controlled oscillator 31a as explained above, for controlling the frequency of the drive signal. Also in the A/D converter 227, said output signal is transmitted to the amplification amount controlling portion 228 as explained above, for controlling the voltage of the drive signal.

For increasing the output of the ultrasonic motor under control, the frequency f1 is decreased and the voltage is increased. Also, for decreasing the output of the ultrasonic motor, the frequency f1 is increased and the voltage is decreased. In this manner the frequency and the voltage are controlled in mutually opposite directions for a given value of Vi. In the present embodiment, since Vi=Vo+Vr, the entered Vi is processed as:

$$b \times (-1 \times Vi + 2Vo) = b \times (Vo - Vr)$$

wherein b is a coefficient, and the thus calculated value is subjected to the A/D conversion.

Figure 18:
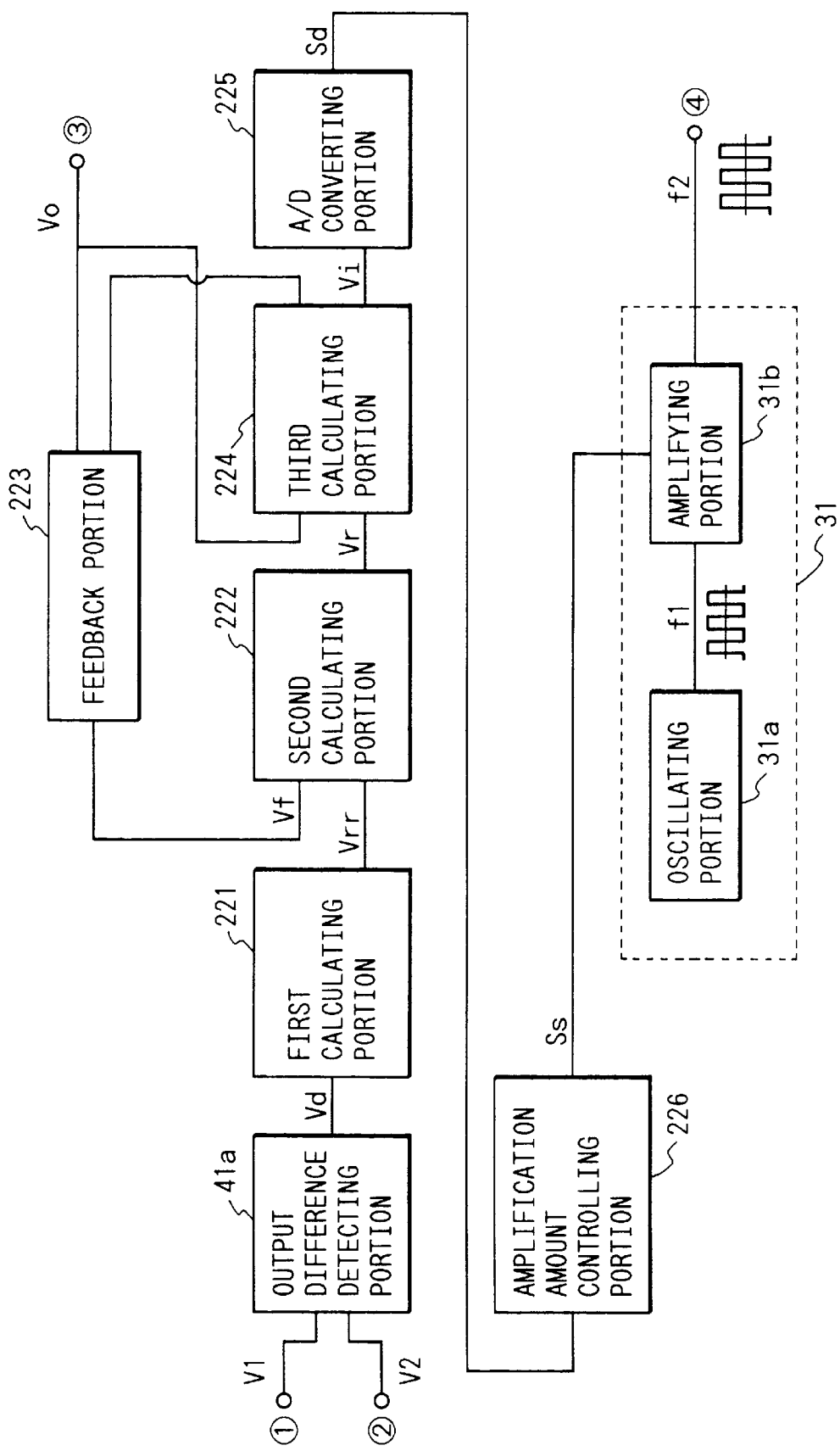
FIG. 18 is a view showing the voltage controlling method in the drive control device of the present invention for ultrasonic motors.
Figure 20:
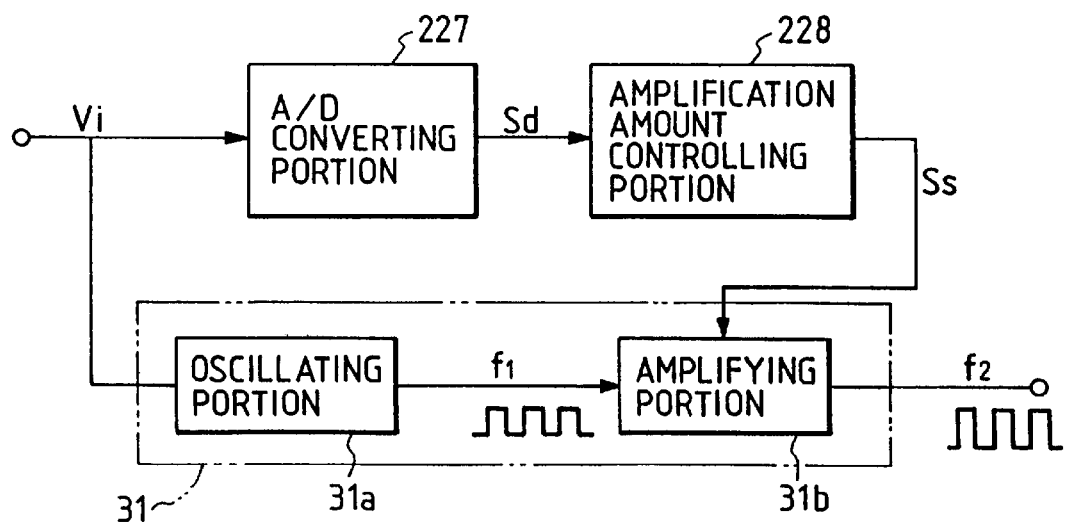
FIG. 20 is a view of a portion for controlling the voltage and the frequency of the drive signal.

In the foregoing, there have been explained a method of controlling the driving frequency of the oscillation portion with reference to FIG. 17, a method of controlling the voltage of the drive signal of the oscillation portion with reference to FIG. 18, and a method of controlling the driving frequency and the driving signal voltage, with reference to FIG. 20. However, the control of the driving frequency and/or the driving signal voltage is not limited to those explained in the foregoing, but any other method capable of such control also belongs to the present invention.

Figure 21:
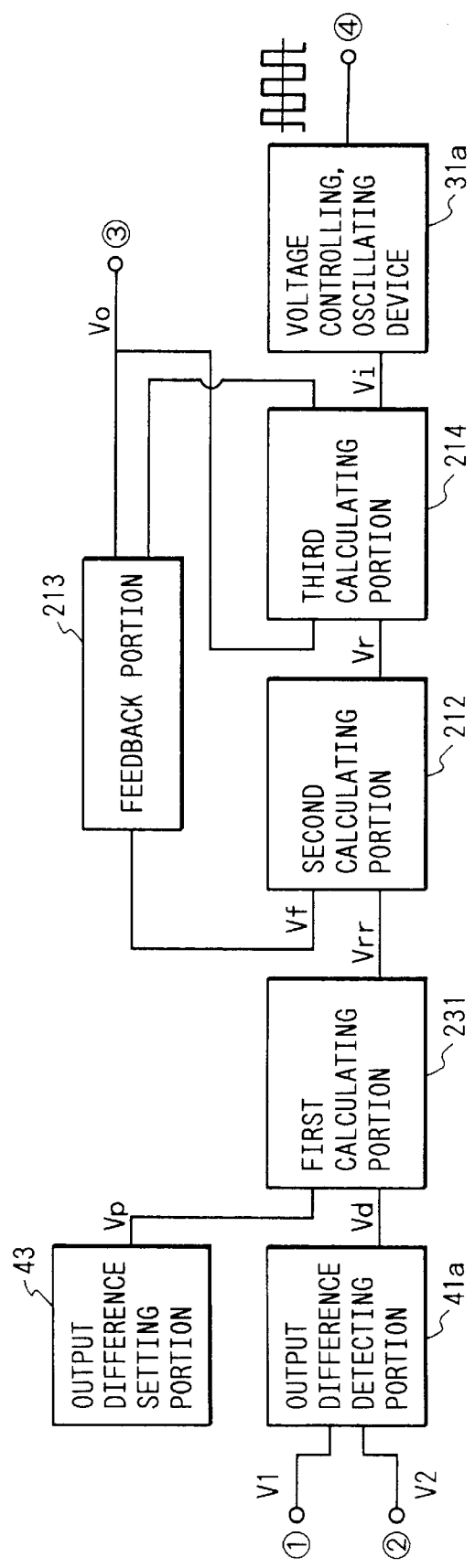
FIG. 21 is a view of a 5th embodiment of the drive control device of the present invention for ultrasonic motors.

In the following there will be explained, with reference to FIG. 21, the procedure from the detection of the output difference to the control of the oscillation portion in the 5th embodiment.

Terminals (1), (2) are respectively connected to mechanoelectrical converting elements 25ap, 35ap, provided on the piezoelectric members 25a, 35a of the 1st and 2nd ultrasonic motors 24, 34 shown in FIG. 7, and respectively receive the voltages of the oscillation signals from the stators 25, 35 of said 1st and 2nd ultrasonic motors.

As already explained with reference to FIG. 6, the difference of said voltages V1, V2 can be regarded as the difference in the outputs (generated torques) of said 1st and 2nd ultrasonic motors 24, 34. Consequently said difference of the voltages V2, V1 can be utilized for matching the difference of the generated torques of said 1st and 2nd ultrasonic motors 24, 34 with a set value.

The difference of the voltages V2 and V1 is calculated (Vd=V1–V2) in the output difference detecting portion 41a. The obtained result Vd (=V1–V2) becomes positive or negative, respectively, if the alternating voltage is larger in the 1st motor 24 or in the 2nd motor 34. Said value Vd indirectly indicates the relative difference in the current torques of two ultrasonic motors 24, 34, and becomes larger in the absolute value as said difference in the torques increases.

On the other hand, the output difference setting portion 43 sets a difference Vp in the outputs of the two ultrasonic motors 24, 34 and sends said difference Vp to a 1st calculating portion 231. Said value Vp is taken as positive or negative respectively, if the output of the 2nd ultrasonic motor 34 is larger or smaller than that of the 1st motor 24.

The 1st calculating portion 231 calculates the difference between the detected difference Vd and the predetermined difference Vp, and multiplies said difference with a coefficient –1×a for obtaining a control voltage. The obtained value Vrr (=–1×a×(Vd–Vp)) indicates the relative correction amount between the current output difference of the 1st and 2nd ultrasonic motors 24, 34 and becomes larger in the absolute value as the correction amount increases.

The 2nd and 3rd calculating portions 212, 214 are similar to those explained in FIG. 17, and will not, therefore, be explained further.

In the following there will be considered the correction of the output difference of the 1st and 2nd ultrasonic motors 24, 34 according to the 5th embodiment.

At first it is assumed that the torque generated by the 2nd motor 34 is smaller than the predetermined value, with respect to the output of the 1st motor 24. In such case the frequency of the drive signal for the 2nd motor 34 is increased, thereby increasing the generated torque for a certain rotating speed. In this case, since Vd is larger than Vp, Vrr becomes negative to reduce Vr and Vi, whereby the frequency of the drive signal from the voltage-controlled oscillator 31a decreases.

On the other hand, if the torque generated by the 2nd motor 34 is larger than the predetermined value, with respect to the output of the 1st motor 24, the frequency of the drive signal for the 2nd motor 34 is increased to reduce the generated torque for a certain rotating speed. In this case, since Vd becomes smaller than Vp, Vrr becomes positive to increase Vr and Vi, whereby the frequency of the drive signal from the voltage-controlled oscillator 31a increases.

In the 5th embodiment, the oscillator 31a is controlled by a variation in the frequency of the drive signal, but such control may also be achieved by a variation in the voltage of the drive signal.

Figure 22:
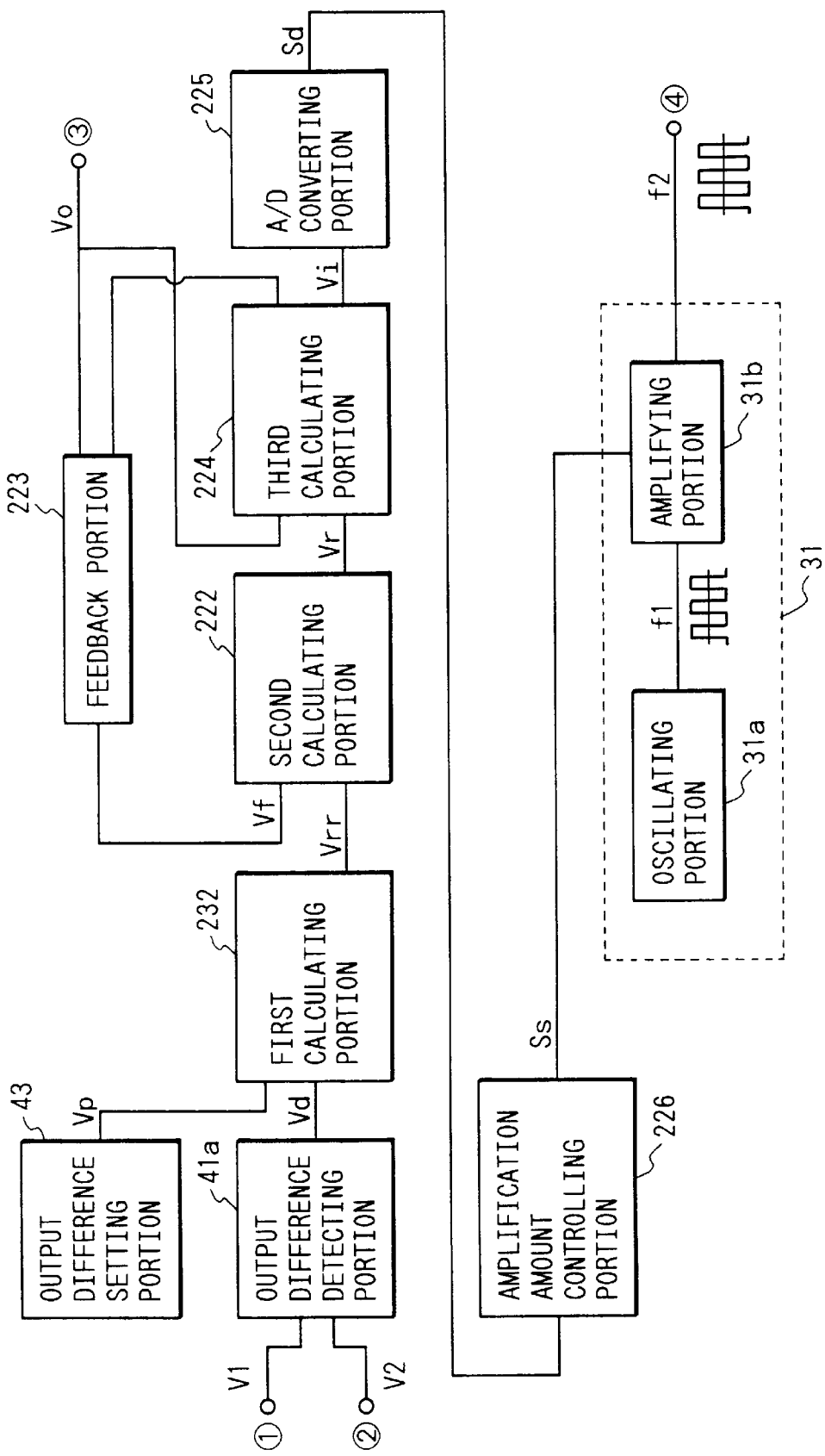
FIG. 22 is a view showing the voltage controlling method in the drive control device of the present invention for ultrasonic motors.

In the following there will be explained, with reference to FIG. 22, the method of voltage control.

Terminals (1), (2) are respectively connected to the mechanoelectrical converting elements 25ap, 35ap, provided on the piezoelectric members 25a, 35a of the 1st and 2nd ultrasonic motors 24, 34 (not shown in this figure), and respectively receive the voltages of the oscillation signals of the stators 25, 35 of said 1st and 2nd motors.

As already explained with reference to FIGS. 4 and 6, the difference of said voltages V1, V2 can be regarded as the difference in the outputs (generated torques) of the 1st and 2nd motors 24, 34. Consequently said difference of the voltages V2, V1 can be utilized for matching the difference in the generated torques of the 1st and 2nd ultrasonic motors 24, 34 with a predetermined value.

The difference between the voltages V2 and V1 is calculated (Vd=V1-V2) by the output difference detecting portion 41a, and the obtained result Vd (=V1-V2) becomes positive or negative, respectively, if the alternating voltage is larger in the 1st motor 24 or in the 2nd motor 34. Said value Vd indirectly indicates the relative difference in the current torques of two ultrasonic motors 24, 34, and becomes larger in the absolute value as said difference increases.

On the other hand, the output difference setting portion 43 sets the output difference Vp for the two motors 24, 34 and sends said value Vp to a 1st calculating portion 232. Said value Vp is taken positive or negative, respectively, when the output of the 1st motor 24 is selected larger or smaller than that of the 2nd motor 34.

The 1st calculating portion 232 calculates the difference between the detected difference Vd and the predetermined difference Vp, and multiplies the difference by a coefficient a for obtaining a control voltage. The obtained value Vrr (=a×(Vd-Vp)) indicates the relative correction amount between the current output difference of the 1st and 2nd ultrasonic motors 24, 34 and the predetermined value, and increases in the absolute value as the amount to be corrected becomes larger.

The configuration after a 2nd calculating portion 222 is the same as that shown in FIG. 18. Thus the components are represented by the same symbols, and the explanation therefor are omitted.

In the following there will be considered the correction of the output difference between the 1st and 2nd ultrasonic motors 24, 34, according to the configuration shown in FIG. 22.

At first it is assumed that the torque generated in the 2nd ultrasonic motor 34 is smaller than the predetermined value, with respect to that of the 1st motor 24. In such case the voltage of the drive signal for the 2nd motor 34 is increased, thereby increasing the generated torque at a certain rotating speed. Since Vd becomes larger than Vp in this case, vrr becomes positive, thus increasing Vr and Vi, whereby a signal for increasing the amplification gain is transmitted to the amplification gain controlling portion 226, which, in response, selects one of the switching elements Q1–Q8 connected to the resistors Rf1–Rf8, so as to increase the amplification gain, whereby the drive signal from the oscillation portion 31a increases in the voltage.

On the other hand, if the generated torque of the 2nd motor 34 is larger than the predetermined value, with respect to that of the 1st motor 24, the voltage of the drive signal for the 2nd ultrasonic motor 34 is decreased, thereby reducing the torque at a certain rotating speed. Since Vd becomes smaller than Vp, Vrr becomes negative, thus reducing Vr and Vi, whereby a signal decreasing the amplification gain is transmitted to the amplification gain controlling portion 226, which, in response, selects one of the switching elements Q1–Q8 connected to the resistors Rf1–Rf8, so as to decrease the amplification gain, whereby the drive signal from the oscillation portion is decreased in the voltage.

In the foregoing there have been explained methods for controlling the frequency or the voltage of the drive signal from the oscillation portion 31a, but it is also possible to control both the voltage and the frequency of said drive signal. The configuration for such control is similar to that shown in FIG. 20, and will not, therefore, be explained further.

In the following there will be explained, with reference to FIG. 23, the procedure in the 6th embodiment from the electromagnetic detection of the torsion of the output shaft 70 to the control of the oscillation portion 51.

Terminals (1), (2) are connected to the torsion amount detecting portion 71 provided between the 1st and, 2nd movable members 56, 66 shown in FIG. 8, and respectively receive signals from the electromagnetic pickups 83, 84 corresponding to the gears 81, 82 positioned respectively close to the ultrasonic motors 54, 64 shown in FIG. 9.

The shaft 70 is twisted by a torsion moment, corresponding to the torque generated by the 1st ultrasonic motor 54. In response, the terminals (1), (2) respectively receive sinusoidal waves with a mutual phase difference, and said sinusoidal waves are converted by square wave converting portions 241a, 241b.

A phase difference detecting portion 242a releases a square wave E, corresponding to the difference from the upshift of a square wave A for the terminal (1) to that of a square wave B for the terminal (2). Said square wave E becomes longer in duration, as the amount of torsion of the shaft 70 increases.

On the other hand, terminals (3), (4) are connected to the torsion amount detecting portion 72 provided between the 2nd movable member 66 and the load portion, and respectively receive signals from the electromagnetic pickups corresponding to gears respectively positioned close to the 2nd motor 64 and the load portion.

The shaft 70 in this position is twisted by a torsion moment, corresponding to the sum of the torques generated by the 1st and 2nd ultrasonic motors 54, 64. In response, sinusoidal waves with a mutual phase difference are supplied to the terminals (3) and (4), and are converted by square wave converting portions 241c, 241d.

A phase difference detecting portion 242b releases a square wave F, corresponding to the difference from the upshift of the square wave C for the terminal (3) to that of the square wave D for the terminal (4).

The square waves from the phase difference detecting portions 242a, 242b are respectively converted, in voltage conversion portions 243a, 243b comprising, for example of switching regulators, into voltages Vc, Vc1 corresponding to the duration times of said square waves. Said voltage Vc is used in a 1st calculating portion 244, in calculating the excess or deficiency of the torque, in comparison with the torque Vc1/2 to be generated by the ultrasonic motors 54, 64 in the following manner:

$$-1 \times \{Vc1/2-(Vc1-Vc)\}=Vc1/2-Vc.$$

The obtained result Vd becomes negative or positive, respectively, if the generated torque is larger in the 1st motor 54 or in the 2nd motor 64. A 2nd calculating portion 245 multiplies said voltage Vd by a coefficient a for obtaining a control voltage Vrr, which indicates the relative correction amount with respect to the current torque generated by the 2nd motor 64 and which becomes larger in the absolute value as the torsion amount (generated torque) increases.

Then a 3rd calculating portion 246 adds said correction amount Vrr to a voltage Vf from a feedback portion 247, thereby determining an absolute correction amount Vr with respect to a reference voltage Vo. Then a 4th calculating portion 248 adds said correction amount Vr to the reference voltage Vo from a terminal (5), thereby obtaining a value Vi, which is supplied to a voltage-controlled oscillator (VCO) 249 and the feedback portion 247.

The VCO 249 generates a signal of a frequency corresponding to said value Vi at a terminal (6), for supply to an unrepresented wave shaping portion, thereby varying the torque and the rotating speed of the 2nd ultrasonic motor 64. Then the difference in the torques generated in both ultrasonic motors is entered from the terminals (1), (2), (3) and (4), and Vrr is calculated.

On the other hand, the feedback portion 247 receives the value Vi from the 4th calculating portion 248, calculates the difference Vf from the reference voltage Vo, and returns said difference Vf to the 3rd calculating portion 246. The 3rd and 4th calculating portions 246, 247 add said Vf and the re-entered Vrr, and further add the reference voltage Vo to obtain Vi.

In practice, however, the rotating speed may not vary instantaneously because of the inertia of the movable member. For this reason, the difference between the torques to be generated by the ultrasonic motors 54, 64 corresponding to the value Vf at a certain time may be different from the actual difference of the torques of the motors 54, 64, so that the correction amount calculated in the 3rd and 4th calculating portions 246, 248 may be different from the actually required correction amount.

Consequently, for improving the effect of correction, there is conceived a method of correction within divided time intervals. More specifically, such correction can be achieved by entering clock pulses into the feedback portion 247, thereby causing the feedback portion 247 to receive the value Vi only during the entry of a clock pulse and to retain the value Vf for supply to the 2nd calculating portion 245, during the interval between the clock pulses. This method can reduce the error in Vrr, resulting from the response time of the rotating speed.

Figure 23:
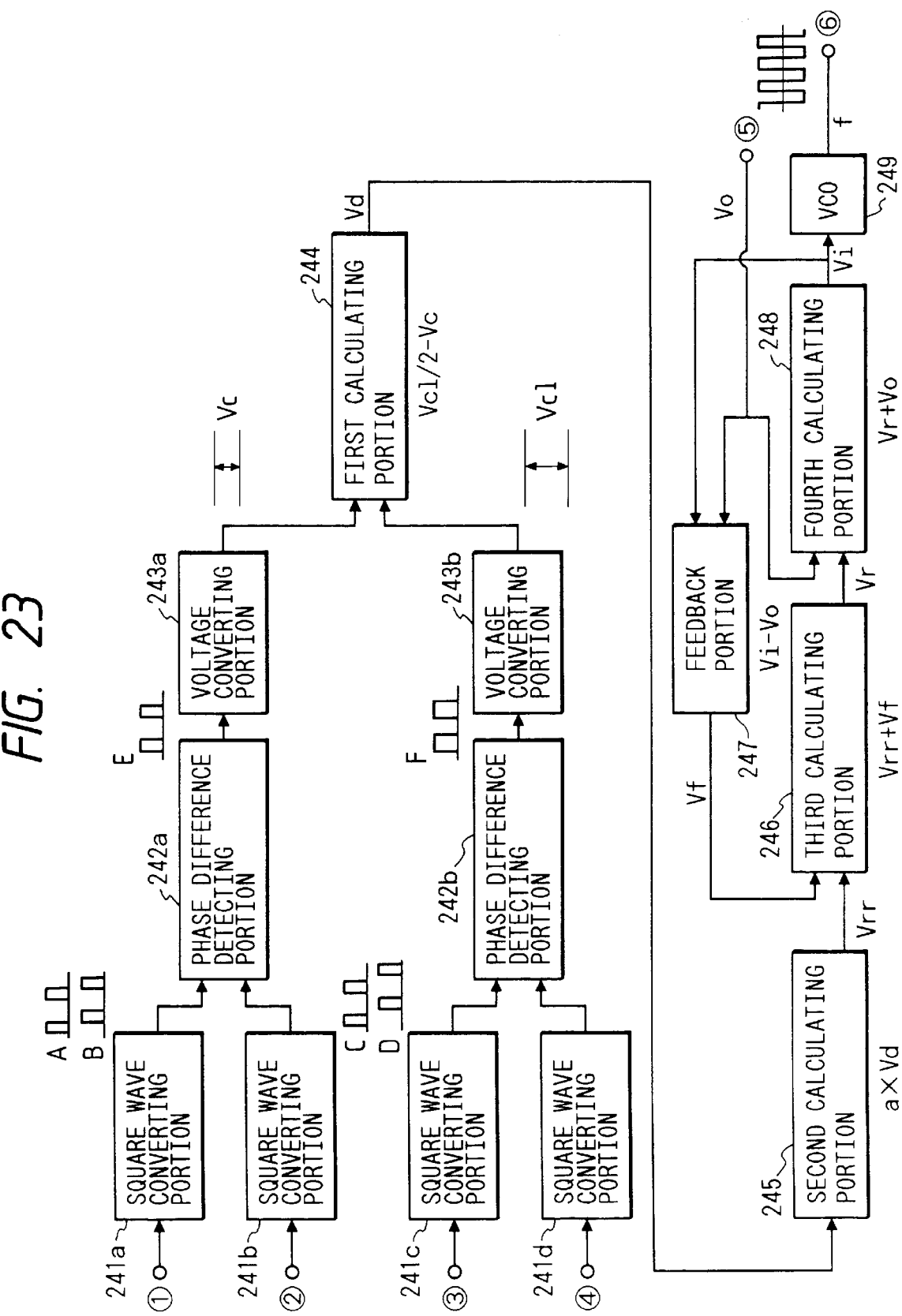
FIG. 23 is a view of an output controlling portion in a 6th embodiment.

The electrical detection with strain gauges allows to directly obtain Vc and Vc1 shown in FIG. 23, and the correction of the driving frequency can be realized by employing a similar configuration in the succeeding calculating portions 247, feedback portion and VCO 249.

In the following there will be considered the correction of the 6th embodiment for the difference of the 1st and 2nd ultrasonic motors 54, 64.

At first there is assumed a case in which the torque generated by the 2nd ultrasonic motor 64 is smaller. In such situation, according to the relationship shown in FIG. 4, between the generated torque and the rotating speed of the ultrasonic motor in the driving frequency range, the frequency of the input drive signal for the 2nd motor 64 is decreased, thereby increasing the torque at a certain rotating speed. Since Vc becomes larger than Vc1/2, Vd becomes negative. Consequently Vrr also becomes negative to reduce Vr and Vi, whereby the frequency f decreases. Thus, the rotating speed of the entire output shaft increases, but it is corrected by the 1st controlling portion 57 as explained before.

On the other hand, if the torque generated by the 2nd ultrasonic motor 64 is larger, the frequency of the input drive signal for said 2nd motor 64 is increased, thereby reducing the generated torque for a certain rotating speed. Since Vc becomes smaller than Vc1/2, Vd becomes positive. Consequently, Vrr becomes also positive, thereby increasing Vr and Vi, whereby the frequency f increases. Thus the rotating speed of the entire output shaft decreases, but it is corrected, as explained before, by the 1st controlling portion 57.

The method of the 6th embodiment, comprising the step of detecting the generated torques by the measurement of the torsion on the shaft 70 and thereby obtaining uniform torques from the ultrasonic motors 54, 64 is capable of automatically adjusting the eventual individual fluctuation in the ultrasonic motors 54, 64 because the outputs of said motors can be directly reflected on the correction of the driving frequencies, and is also capable of providing a suitable driving frequency matching the rotating speed when said speed is varied.

As explained in the foregoing, the correction of the driving frequency based on the detection of the phase difference of gears or of the output of strain gauges is only a method for attaining the objects of the present invention, and is not to be construed as to limit the present invention.

Then, in the following there will be explained, in the 7th embodiment which corrects the voltage of the drive signal instead of the frequency thereof, the procedure from the electromagnetic detection of the torsion of the output shaft 70 to the control of the oscillation portion 51, with reference to FIG. 24, wherein same components as those in the embodiment shown in FIG. 23 will be represented by the same symbols and will not be explained further.

The square waves from the phase difference detecting portions 242a, 242b are respectively converted, by voltage conversion portions 243a, 243b comprising, for example, switching regulators, into voltages Vc, Vc1 corresponding to the durations of said square waves. Said voltage Vc is used in a 1st calculating portion 250 in the calculation of the relative correction amount, indicating the excess or deficiency of the torque in comparison with the torque Vc1/2 to be generated by both ultrasonic motors 54, 64, according to a calculation:

$$Vc1/2-(Vc1-Vc)=-Vc1/2+Vc.$$

The obtained result Vd becomes positive or negative, respectively, if the generated torque is larger in the 1st motor 54 or in the 2nd motor 64. Said voltage Vd indicates the relative correction amount for the current torque generated by the 2nd ultrasonic motor 64, and becomes larger in the absolute value as the amount of torsion (generated torque) increases. In order to elevate said voltage Vd to a control voltage, a 2nd calculating portion 245 multiples a coefficient a, and the thus obtained value Vrr indicates a relative correction amount with respect to the current torque generated by the 2nd motor 64 and becomes larger in the absolute value as the amount of torsion (generated torque) increases.

Then a 3rd calculating portion 246 adds said correction amount Vrr to a voltage Vf from a feedback portion 247 to obtain an absolute correction amount Vr with respect to a reference voltage Vo. Then a 4th calculating portion 248 adds said voltage Vr and the reference voltage Vo from a terminal (5) to obtain a value Vo, which is supplied to an A/D converter 225 and the feedback portion 247.

The A/D converter 225 sends a digital signal Sd, corresponding to said value Vi, to an amplification gain controlling portion 226, which sends a control signal Ss, corresponding to said signal Sd, to an amplifying portion 61b for amplifying the drive signal from an oscillation portion 61a in the 2nd oscillation portion 61, with an amplification gain corresponding to said control signal Ss. Said amplification gain in the amplifying portion 61a is made larger or smaller, respectively, if the value Va is larger or smaller.

The 2nd oscillation portion 61 comprises the oscillation portion 61a and the amplifying portion 61b, wherein the drive signal from the former portion 61a is amplified in the latter portion 61b with a selected amplification gain and is transmitted to a phase shifting portion 62.

The device for selecting the amplification gain of the drive signal is similar to that shown in FIG. 19.

Figure 24:
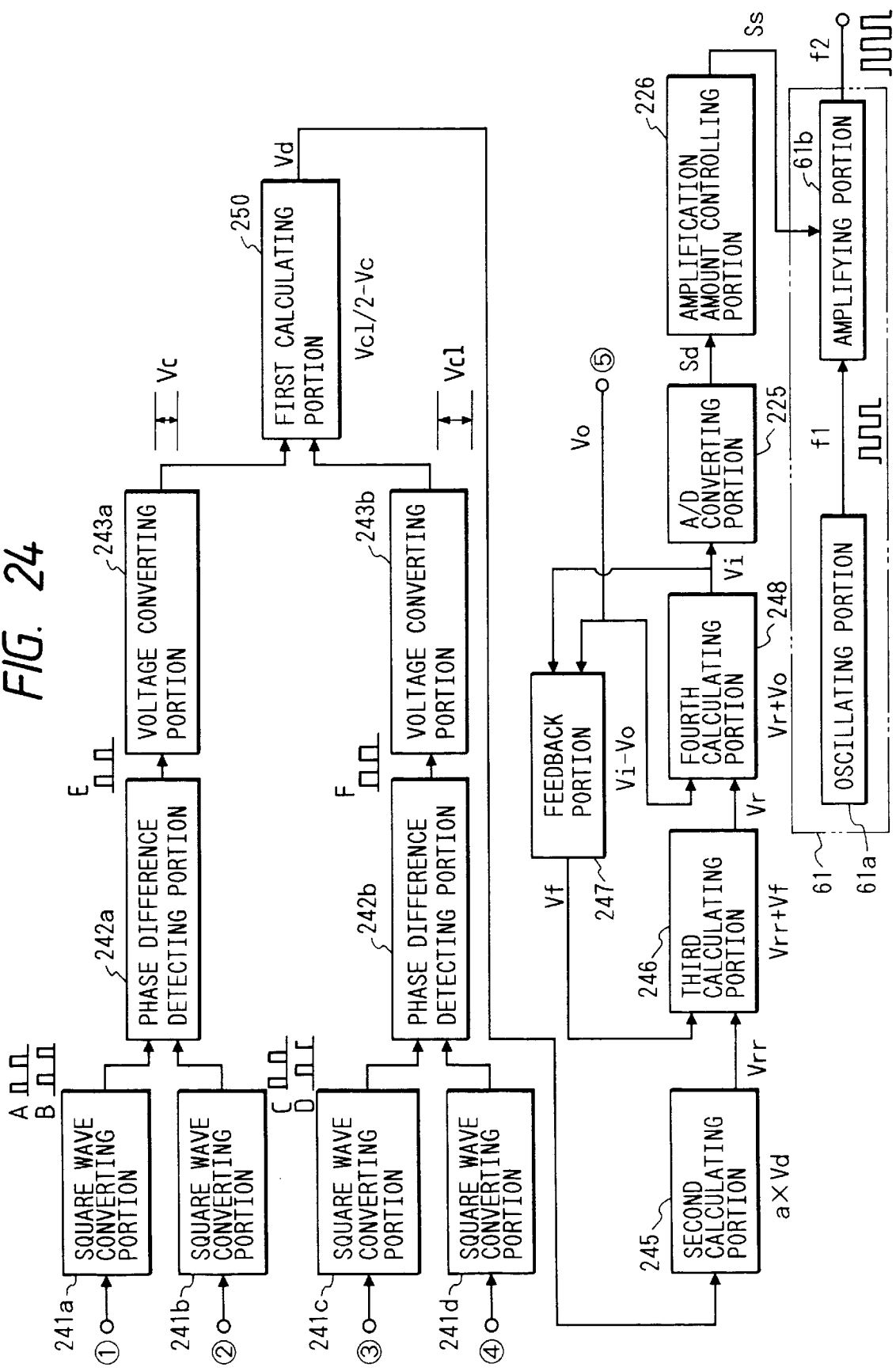
FIG. 24 is a view showing the output control of the second ultrasonic motor in a 7th embodiment.

The electrical detection with strain gauges allows for Vc and Vc1 shown in FIG. 24 to be obtained directly, and enables correction of the voltage of the drive signal, by employing a similar configuration in the calculating portions, A/D converter 225, amplification gain controlling portion 226, amplifying portion 61b, etc.

In the following there will be considered the correction on the difference of torques of the 1st and 2nd ultrasonic motors 54, 64, according to the 7th embodiment.

At first it is assumed that the generated torque is smaller in the 2nd motor 64. In such a situation, according to the relationship, shown in FIG. 5, of the generated torque and the rotating speed of the ultrasonic motor in the driving frequency range, the voltage of the drive signal for the 2nd motor 64 is increased to increase the generated torque at a certain rotating speed. Since Vc becomes larger than Vc1/2, Vd becomes positive. Consequently Vrr also becomes positive, thereby increasing Vr and Vi, whereby a signal for increasing the amplification gain is transmitted to an amplification gain controlling portion 226, which selects one of the switching elements Q1–Q8 respectively connected to the resistors Rf1–Rf8, so as to increase the amplification gain, thereby increasing the voltage of the drive signal from the oscillation portion 61a. Thus, the rotating speed of the entire output shaft increases, but it is corrected in the 1st control portion 57.

On the other hand, if the generated torque is larger in the 2nd motor 64, the voltage of the drive signal therefor is decreased, in order to reduce the generated torque at a certain rotating speed. Since Vc becomes smaller than Vc1/2, Vd becomes negative. Consequently Vrr becomes also negative, thus decreasing Vr and Vi, whereby a signal decreasing the amplification gain is transmitted to the amplification gain controlling portion 226, which, in response, selects one of the switching elements Q1–Q8, connected to the resistors Rf1–Rf8, so as to reduce the amplification gain, thereby reducing the voltage of the drive signal supplied from the oscillation portion 61a.

The rotating speed of the entire output shaft decreases, but it is corrected as explained before by the 1st control portion 57.

The method of the 7th embodiment for detecting the generated torques by measuring the amount of torsion of the shaft 70 and thereby obtaining uniform torques from the ultrasonic motors 54, 64 is capable of automatic adjustment for the eventual individual fluctuation of said motors 54, 64 because the outputs thereof can be directly reflected on the correction of the driving signal voltage, and is also capable of obtaining a suitable driving signal voltage matching the rotating speed when it is varied.

As already explained before, the detection of the driving signal voltage based on the detection of the phase difference of gears or of the outputs of strain gauges is merely a method for attaining the objects of the present invention, and is not to be construed as to limit the present invention.

The 6th and 7th embodiments relate to the correction of the drive signal in case two ultrasonic motors are connected by a single rotary member. In the following there will be explained the correction of the drive signal in the 8th and 9th embodiments in which three or more ultrasonic motors are connected by a rotary member as shown in FIG. 11.

The correction of the 8th embodiment can be executed with the configuration and the procedure shown in FIG. 23, but the calculation in the 1st calculating portion 244 has to be modified as follows.

Signals indicating the torsion amounts, entered from the 1st to 3rd torsion amount detecting portions 111, 112, 113 shown in FIG. 11 are obtained as voltages through the square wave converting portions, the phase difference detecting portion and the voltage conversion portions, as in the case of FIG. 23.

For controlling the 2nd ultrasonic motor 94, the 1st calculating portion 244 executes a calculation:

$$-1 \times \{VcL/3 - (Vc2 - Vc1)\}$$

wherein Vc1, Vc2, VcL are output voltages corresponding to the inputs from said 1st to 3rd torsion amount detecting portions 111, 112, 113. This calculation allows a judgement as to whether the torque generated by the 2nd motor 94 is too large or too small, and the frequency correction can be attained, after the 2nd calculating portion 245, with a same configuration and a same procedure as in FIG. 23.

Also for controlling the 3rd motor 104, the 1st calculating portion 244 executes a calculation:

$$-1 \times \{VcL/3 - VcL - Vc2)\}.$$

This calculation allows a judgment as to whether the torque generated by the 3rd motor 104 is too large or too small, and the frequency correction can be attained, after the 2nd calculating portion 245, with a same configuration and a same procedure as in FIG. 23.

In the following there will be explained the 9th embodiment in which the correction is made on the voltage of the drive signal, instead of the frequency thereof in the 8th embodiment.

The correction of said 9th embodiment can be executed with the configuration and the procedure shown in FIG. 24, but the calculation in the 1st calculating portion 250 has to be modified as follows.

Signals indicating the torsion amounts, entered from the 1st–3rd torsion amount detecting portions 111, 112, 113 shown in FIG. 11 are obtained as voltages through the square wave converting portions, the phase difference detecting portion and the voltage conversion portions, as in the case of FIG. 24.

For controlling the 2nd ultrasonic motor 94, the 1st calculating portion 250 executes a calculation;

$$VcL/3 - (Vc2 - Vc1)$$

wherein Vc1, Vc2, VcL are output voltages corresponding to the inputs from said 1st–3rd torsion amount detecting portions 111, 112, 113. This calculation allows a judgement as to whether the torque generated by the 2nd motor 94 is too large or too small, and the frequency correction can be attained with a same configuration and a same procedure after the 2nd calculating portion 250 as in FIG. 24.

Also, for controlling the 3rd motor 104, the 1st calculating portion 250 executes a calculation $$VcL/3 - (VcL - Vc2).$$

This calculation allows a judgment as to whether the torque generated by the 3rd motor 104 is too large or too small, and the frequency control can be attained, after the 2nd calculating portion 245, with a same configuration and a same procedure as in FIG. 24.

In the present invention, the output of an ultrasonic motor is determined from the detected data of the oscillation signal voltage, the input current or the phase difference, but the output may be different even for the same data, because of individual fluctuation of the motors, and there may result an offset among the plural ultrasonic motors to be controlled because of this reason. A method of providing an offset correcting portion and transmitting information therefrom to the output difference detecting portion, for the purpose of further reducing the difference in the outputs of the motors, also belongs to the present invention.

Figure 25:
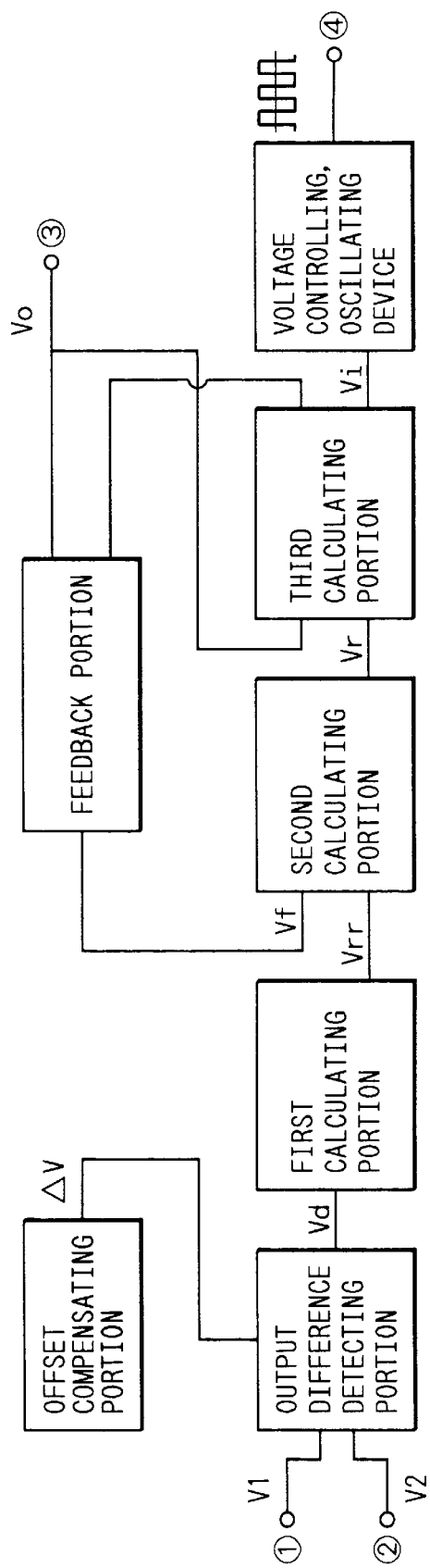
FIG. 25 is a view of another embodiment of the drive control device of the present invention for ultrasonic motors.

FIG. 25 illustrates still another embodiment of the drive control device of the present invention, for ultrasonic motors.

The configuration and the function of this embodiment are similar to those of the 1st embodiment, but there is provided an offset correcting portion, of which information is transmitted to the output difference detecting portion. Said output difference detecting portion determines the difference between the oscillation signal voltages V1, V2 and adds the correction value ΔV from said offset correcting portion (Vd=V1−V2+ΔV), and sends the thus obtained value to the 1st calculating portion. The procedure thereafter is the same as shown in FIG. 17.

The present embodiment has only shown a method of detecting the oscillation signal voltage, but there can be employed the offset correcting portion which is the same in the position, function and effect thereof also when a method of detecting the input current or the phase difference is adopted.

Figure 26:
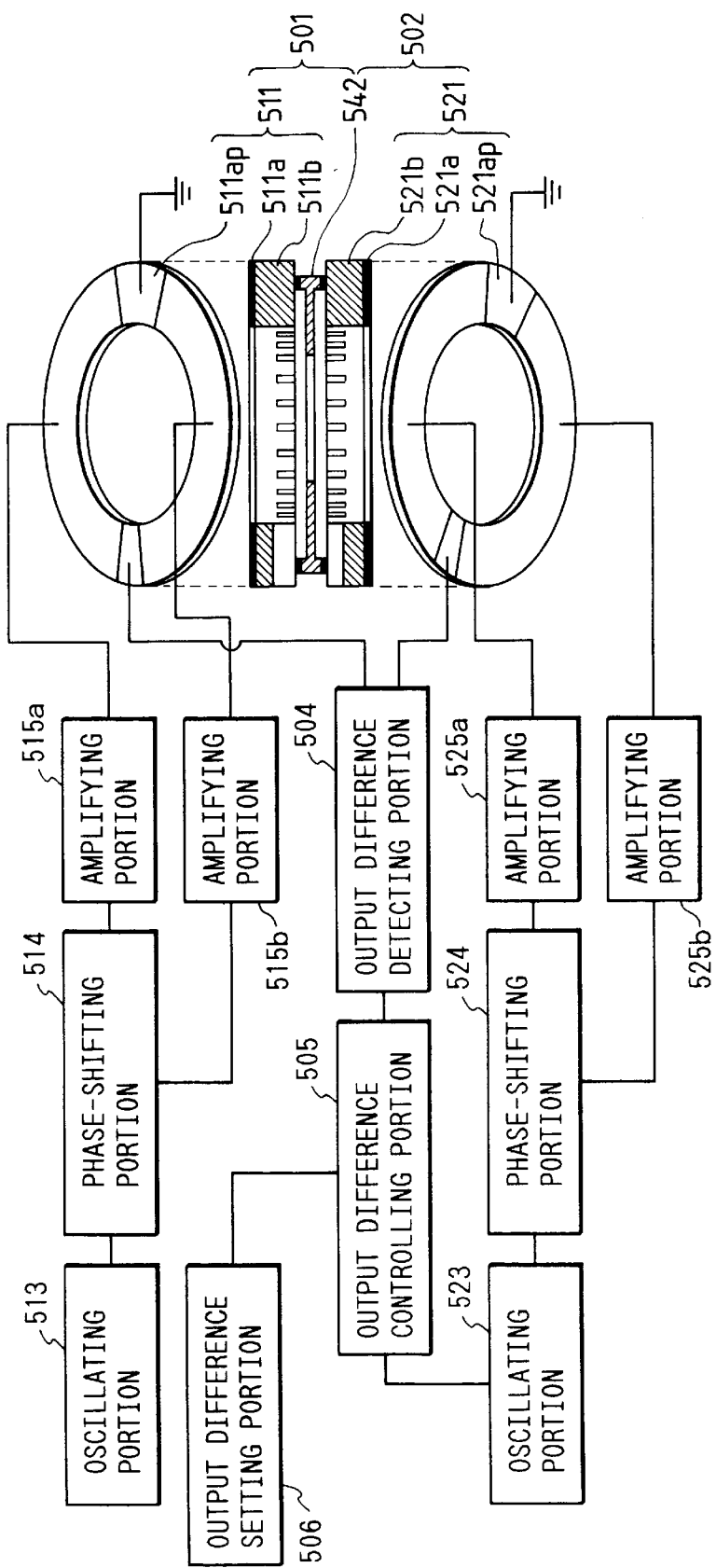
FIG. 26 is a view of still another embodiment of the drive control device of the present invention for ultrasonic motors.

FIG. 26 shows another embodiment of the drive control device of the present invention, for ultrasonic motors.

In this embodiment, a 1st ultrasonic motor 501 comprises a 1st stator 511 including a piezoelectric member 511a oscillated by the amplified drive signals from 1st amplifying portions 515a, 515b, and an elastic member 515b adhered to said piezoelectric member 511a and adapted to generate a travelling vibration wave on the driving surface by said oscillation, and a movable member 542 maintained in pressure contact with the driving surface of the elastic member 511b and driven by said travelling vibration wave.

On the other hand, a 2nd ultrasonic motor 502 comprises a 1st stator 521 including a piezoelectric member 521a oscillated by the amplified drive signals from 1st amplifying portions 525a, 525b, and an elastic member 521b adhered to said piezoelectric member 521a and adapted to generate a travelling vibration wave on the driving surface by said oscillation, and a movable member 542 maintained in pressure contact with the driving surface of said elastic member 521b and driven by said travelling vibration wave.

Thus, in this embodiment, the 1st and 2nd ultrasonic motors 501, 502 commonly utilize a movable member 542, to which an output shaft (not shown) is connected.

Also in this embodiment, the 1st and 2nd ultrasonic motors 501, 502 can be controlled with a difference in the outputs.

In the foregoing embodiments, the electro-mechanical converting element, employed for converting the electrical energy into mechanical energy and adhered to the elastic member for generating a travelling vibration wave on the driving surface thereof, comprises a piezoelectric member, but an electrostriction element may also be employed for this purpose.

As explained in detail in the foregoing, in case of driving a single rotary member with plural ultrasonic motors, the present invention enables independent drive control for said motors, by detecting the torques generated by said plural motors, for example through the amount of torsion of the shaft.

The torques generated by said motors can be made substantially equal by the correction on the driving frequency.

Also the generated torques can be made substantially uniform by the correction on the voltage of the drive signal, or by the correction on both the frequency and the voltage of the drive signal.

Furthermore, in case a difference is required in the outputs of plural ultrasonic motors, the present invention detects the outputs of the 1st and 2nd ultrasonic motors, for example, through oscillation signals from mechanoelectrical converting elements provided on vibration members of said motors and provides the required difference of the outputs, according to the result of said detection.

Furthermore, in case of driving a movable member with plural ultrasonic motors, the present invention enables independent drive control of said motors based on the detection of the torques generated by the 1st and 2nd ultrasonic motors, through the oscillation signals obtained from the mechanoelectrical converting elements provided on the vibration members of said motors, the input currents to said vibration members, or the phase difference between the oscillation signals from said mechanoelectrical converting elements and the drive signals to said vibration members.

The torques generated by said motors can be made substantially uniform by the correction on the frequency and/or the voltage of the drive signal.

It is thus made possible to obtain substantially the same outputs from the ultrasonic motors even without the adjusting step therefor, and, also in case of varying the rotating speed according to the situation of operation, to obtain substantially the same torques from the ultrasonic motors, thereby achieving efficient operation.

It is further possible to obtain a predetermined difference in the outputs of the ultrasonic motors.

What is claimed is:

1. A drive control device for a system in which at least first and second ultrasonic motors operate concurrently, the drive control device comprising:

a first driving circuit to drive the first ultrasonic motor;

a second driving circuit to drive the second ultrasonic motor;

a detecting circuit to detect an amount of a same parameter associated with the concurrent operation of the first and second ultrasonic motors;

a controlling circuit to control at least one of said first and second driving circuits based on a result of the detection of said detecting circuit; and a connecting member to connect the first and second ultrasonic motors in tandem, wherein said detecting circuit detects an amount of torsion of said connecting member.

2. A drive control device for a system in which at least first and second ultrasonic motors operate concurrently, the drive control device comprising:

a first driving circuit to input a first driving signal to the first ultrasonic motor;

a second driving circuit to input a second driving signal to the second ultrasonic motor;

a detecting circuit to simultaneously detect an amount of a same parameter associated with the concurrent operation of the first and second ultrasonic motors; and a controlling circuit to control at least one of the first and second driving circuits based on a result of the detection of said detecting circuit;

wherein each of the first and second driving signals comprises an alternating voltage;

each of the first and second ultrasonic motors comprises an electro-mechanical energy converting element energized by the alternating voltage applied thereto from a corresponding one of said first and second driving circuits, an elastic body, fixed on said electro-mechanical energy converting element, for generating vibration waves in response to the energizing of said electro-mechanical energy converting element, and a relative moving element in contact with a driving surface of said elastic body so as to be moved by the vibration waves; and said detecting circuit detects a phase difference between the alternating voltage applied to the electro-mechanical energy converting element of the first ultrasonic motor and an alternating voltage generated by a portion of the electro-mechanical energy converting element of the first ultrasonic motor which is not energized by the alternating voltage applied to the electro-mechanical energy converting element of the first ultrasonic motor, and detects a phase difference between the alternating voltage applied to the electro-mechanical energy converting element of the second ultrasonic motor and an alternating voltage generated by a portion of the electro-mechanical energy converting element of the second ultrasonic motor which is not energized by the alternating voltage applied to the electro-mechanical energy converting element of the second ultrasonic motor.

3. A drive control device for a system in which at least first and second ultrasonic motors operate concurrently, the drive control device comprising:

a first driving circuit to input a first driving signal to the first ultrasonic motor;

a second driving circuit to input a second driving signal to second ultrasonic motor;

a detecting circuit to simultaneously detect an amount of a same parameter associated with the concurrent operation of the first and second ultrasonic motors; and a controlling circuit to control at least one of said first and second driving circuits based on a result of the detection of said detecting circuit wherein each of the first and second driving signals comprises an alternating voltage;

each of the first and second ultrasonic motors comprises an electro-mechanical energy converting element energized by the alternating voltage applied thereto from a corresponding one of said first and second driving circuits, an elastic body, fixed to said electro-mechanical energy converting element, for generating vibration waves in response to the energizing of said electro-mechanical energy converting element, and a relative moving element in contact with a driving surface of said elastic body so as to be moved by the vibration waves; and said detecting circuit detects a first input electric current associated with the alternating voltage applied to the electro-mechanical energy converting element of the first ultrasonic motor and a second input electric current associated with the alternating voltage applied to the electro-mechanical energy converting element of the second ultrasonic motor.

4. A drive control device for a system in which at least first and second ultrasonic motors operate concurrently the drive control device comprising:

a first driving circuit to input a first driving signal to the first ultrasonic motor;

a second driving circuit to input a second driving signal to the second ultrasonic motor;

a detecting circuit to simultaneously detect an amount of a same parameter associated with the concurrent operation of the first and second ultrasonic motors; and a controlling circuit to control at least one of said first and second driving circuits based on a result of the detection of said detecting circuit;

wherein the first and second driving signals comprise respective alternating voltages;

said controlling circuit adjusts a frequency of the alternating voltage which is input by at least one of said first and second driving circuits so that a first output of the first ultrasonic motor is substantially equal to a second output of the second ultrasonic motor; and said detecting circuit detects the first and second outputs of said first and second ultrasonic motors, respectively, and when said detecting circuit detects that the first output of the first ultrasonic motor is smaller than the second output of the second ultrasonic motor, said controlling circuit reduces the frequency of the alternating voltage which is input to said first driving circuit.

5. A drive control device for a system in which at least first and second ultrasonic motors operate concurrently, the drive control device comprising:

a first driving circuit to input a first driving signal to the first ultrasonic motor;

a second driving circuit to input a second driving signal to the second ultrasonic motor;

a detecting circuit to simultaneously detect an amount of a same parameter associated with the concurrent operation of the first and second ultrasonic motors;

a controlling circuit to control at least one of said first and second driving circuits based on a result of the detection of said detecting circuit; and an output difference setting circuit to set an output difference between the first ultrasonic motor and the second ultrasonic motor;

wherein said controlling circuit controls at least one of the first and second ultrasonic motors based on the result of the detection of said detecting circuit and the output difference set by said output difference setting circuit.

6. A device according to claim 5, wherein:

the first and second driving signals comprise respective alternating voltages; and wherein said controlling circuit adjusts a frequency of the alternating voltage which is input by at least one of said first and second driving circuits so that an actual output difference between the first ultrasonic motor and the second ultrasonic motor becomes equal to the output difference set by said output difference setting circuit.

7. A device according to claim 5, wherein:

the first and second driving signals comprise respective alternating voltages; and wherein said controlling circuit adjusts a voltage value of the alternating voltage which is input by at least one of said first and second driving circuits so that an actual output difference between the first ultrasonic motor and the second ultrasonic motor becomes equal to the output difference set by said output difference setting circuit.

8. A device according to claim 5, wherein:

the first and second driving signals comprise respective alternating voltages; and wherein said controlling circuit adjusts a frequency and a voltage value of the alternating voltage which is input by at least one of said first and second driving circuits so that an actual output difference between the first ultrasonic motor and the second ultrasonic motor becomes equal to the output difference set by said output difference setting circuit.

9. A drive control device for a system in which at least first and second ultrasonic motors operate concurrently, the drive control device comprising:
   a first driving circuit to drive the first ultrasonic motor;
   a second driving circuit to drive the second ultrasonic motor;
   a detecting circuit to simultaneously detect an amount of a same parameter associated with the concurrent operation of the first and second ultrasonic motors;
   a controlling circuit to control at least one of said first and second driving circuits based on a result of the detection of said detecting circuit; and
   an offset correcting circuit to correct an offset of outputs of the first and second ultrasonic motors and in response, to generate an offset correction value;
   wherein said controlling circuit controls at least one of said first and second driving circuits based on the result of the detection of said detecting circuit and the offset correction value of said offset correcting circuit.

10. A drive control device for a system in which at least first and second ultrasonic motors operate concurrently, the drive control device comprising:
    a first driving circuit to input a first driving signal to the first ultrasonic motor;
    a second driving circuit to input a second driving signal to the second ultrasonic motor;
    a detecting circuit to simultaneously detect an amount of a same parameter associated with the concurrent operation of the first and second ultrasonic motors; and
    a controlling circuit to control at least one of said first and second driving circuits based on a result of the detection of said detecting circuit;
    wherein the first and second driving signals comprise respective alternating voltages;
       said controlling circuit adjusts a frequency and voltage value of the alternating voltage which is input by at least one of said first and second driving circuits so that a first output of the first ultrasonic motor is substantially equal to a second output of the second ultrasonic motor; and
       said detecting circuit detects the first and second outputs of the first and second ultrasonic motors, respectively, and when said detecting circuit detects that the first output of the first ultrasonic motor is smaller than the second output of the second ultrasonic motor, said controlling circuit reduces the frequency and increases the voltage value of the alternating voltage which is input to said first driving circuit.

11. A drive control device for a system in which at least first and second ultrasonic motors operate concurrently, the drive control device comprising:
    a first driving circuit to input a first driving signal to the first ultrasonic motor;
    a second driving circuit to input a second driving signal to the second ultrasonic motor;
    a detecting circuit to simultaneously detect an amount of a same parameter associated with the concurrent operation of the first and second ultrasonic motors; and
    a controlling circuit to control at least one of said first and second driving circuits based on a result of the detection of said detecting circuit;
    wherein the first and second driving signals comprise respective alternating voltages;
       said controlling circuit adjusts a frequency and voltage value of the alternating voltage which is input by at least one of said first and second driving circuits so that a first output of the first ultrasonic motor is substantially equal to a second output of the second ultrasonic motor; and
       said detecting circuit detects the first and second outputs of the first and second ultrasonic motors, respectively, and when said detecting circuit detects that the first output of the first ultrasonic motor is larger than the second output of said second ultrasonic motor, said controlling circuit increases the frequency and reduces the voltage value of the alternating voltage which is input to said first driving circuit.

12. A drive control device for a system having a concurrent operation of at least first and second ultrasonic motors, the drive control device comprising:
    a first driving circuit to drive the first ultrasonic motor;
    a second driving circuit to drive the second ultrasonic motor;
    a connecting member to connect the first and second ultrasonic motors;
    a detecting circuit to detect an amount of torsion of said connecting member associated with the concurrent operation of each of the first and second ultrasonic motors; and
    a controlling circuit to control at least one of said first and second driving circuits based on the amount of torsion detected by said detecting circuit.

13. A drive control device for a system having a concurrent operation of at least first and second ultrasonic motors, the drive control device comprising:
    a first driving circuit to drive the first ultrasonic motor;
    a second driving circuit to drive the second ultrasonic motor;
    a detecting circuit to detect, during the concurrent operation of each of the first and second ultrasonic motors, a first phase difference between a first alternating voltage applied to the first ultrasonic motor and a second alternating voltage generated by a portion of the first ultrasonic motor which is not energized by the first alternating voltage, and a second phase difference between a third alternating voltage applied to the second ultrasonic motor and a fourth alternating voltage generated by a portion of the second ultrasonic motor which is not energized by the third alternating voltage; and
    a controlling circuit to control at least one of said first and second driving circuits based on the first and second phase differences detected by said detecting circuit.

* * * * *